United States Patent
Ishiguro et al.

(10) Patent No.: US 9,592,726 B2
(45) Date of Patent: Mar. 14, 2017

(54) ACTIVE VIBRATION ISOLATING SUPPORT APPARATUS

(71) Applicant: HONDA MOTOR CO., LTD., Minato-Ku, Tokyo (JP)

(72) Inventors: Tetsuya Ishiguro, Wako (JP); Hirotomi Nemoto, Wako (JP); Shungo Fueki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 14/277,413

(22) Filed: May 14, 2014

(65) Prior Publication Data

US 2014/0249733 A1    Sep. 4, 2014

Related U.S. Application Data

(62) Division of application No. 12/228,161, filed on Aug. 8, 2008, now Pat. No. 8,763,996.

(30) Foreign Application Priority Data

Aug. 10, 2007  (JP) ................................. 2007-209438
Aug. 10, 2007  (JP) ................................. 2007-210077
Aug. 15, 2007  (JP) ................................. 2007-211731

(51) Int. Cl.
  *F16F 15/02*   (2006.01)
  *B60K 5/12*    (2006.01)
  (Continued)

(52) U.S. Cl.
  CPC .......... *B60K 5/1283* (2013.01); *F16F 13/268* (2013.01); *F16F 15/002* (2013.01); *F16F 15/02* (2013.01)

(58) Field of Classification Search
  CPC ........ F16F 15/167; F16F 13/268; F16F 15/02; F16F 15/002; B60K 5/1283
  (Continued)

(56) References Cited

U.S. PATENT DOCUMENTS 4,650,170 A     3/1987   Fukushima
5,471,962 A *  12/1995   Nakashima .......... F02M 69/465
                                                    123/456

(Continued)

FOREIGN PATENT DOCUMENTS

EP     1 296 048 A2    3/2003
JP    61-001740 U      1/1986
(Continued)

*Primary Examiner* — Anna Momper
(74) *Attorney, Agent, or Firm* — Carrier Blackman & Associates, P.C.; Joseph P. Carrier; Anne G. Sabourin

(57) ABSTRACT

An active vibration isolating support apparatus reduces vibration transmitted from a reciprocating engine. The apparatus supports the engine via vibration isolating support units each of which includes an actuator. The vibration isolating units are disposed on opposite sides of a crankshaft of the engine. The apparatus includes a control unit to make the actuator extend and contract periodically depending on a vibrational state of the engine so as to reduce the transmission of engine vibrations to a vehicle body. The control unit drives the actuator of one of the vibration isolating support units to contract, the one of the vibration isolating support units being compressed by roll vibration associated with an initial explosion after a time when the engine starts, so as to reduce transmission of roll vibration in a direction which is reverse to the rotation direction of the crankshaft.

4 Claims, 19 Drawing Sheets

(51) Int. Cl.
  *F16F 13/26* (2006.01)
  *F16F 15/00* (2006.01)
(58) Field of Classification Search
  USPC ........................................ 267/140.14–140.15
  See application file for complete search history.

(56) References Cited

U.S. PATENT DOCUMENTS

| | | | |
|---|---|---|---|
| 5,549,284 A * | 8/1996 | Lee .................... | F16F 13/26 248/550 |
| 6,256,545 B1 | 7/2001 | Kimura et al. | |
| 6,315,277 B1 | 11/2001 | Nagasawa | |
| 6,598,468 B2 | 7/2003 | Zur Loye et al. | |
| 7,946,561 B2 * | 5/2011 | Nemoto .................. | F16F 13/26 123/352 |
| 2001/0032919 A1 | 10/2001 | Hagino et al. | |
| 2002/0047417 A1 | 4/2002 | Tebbe | |
| 2002/0079631 A1 | 6/2002 | Nemoto | |
| 2003/0216205 A1 | 11/2003 | Meckstroth et al. | |
| 2004/0232307 A1 * | 11/2004 | Nemoto .................. | F16F 13/26 248/638 |
| 2005/0200061 A1 | 9/2005 | Nemoto | |
| 2006/0139840 A1 | 6/2006 | Yasuda et al. | |

FOREIGN PATENT DOCUMENTS

| | | |
|---|---|---|
| JP | 06-106998 A | 4/1994 |
| JP | 11-159368 A | 6/1999 |
| JP | 11-247919 A | 9/1999 |
| JP | 2001-253251 A | 9/2001 |
| JP | 2002-139095 A | 5/2002 |
| JP | 2006-017288 A | 1/2006 |
| JP | 2006-233841 A | 9/2006 |
| JP | 2007-107579 A | 4/2007 |

* cited by examiner

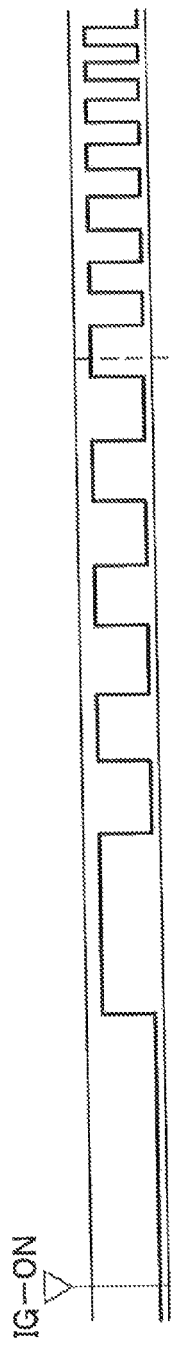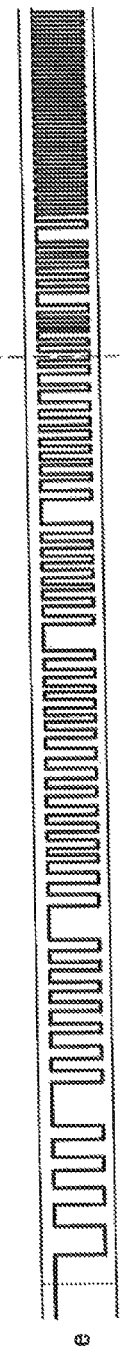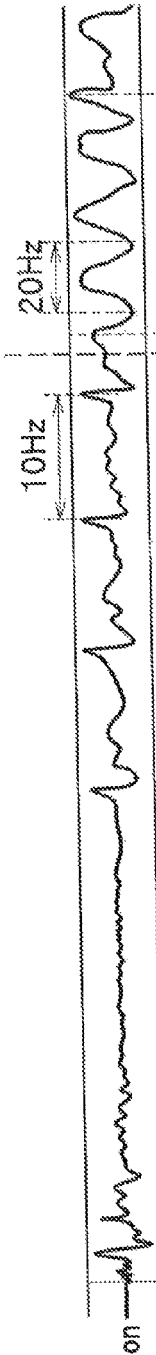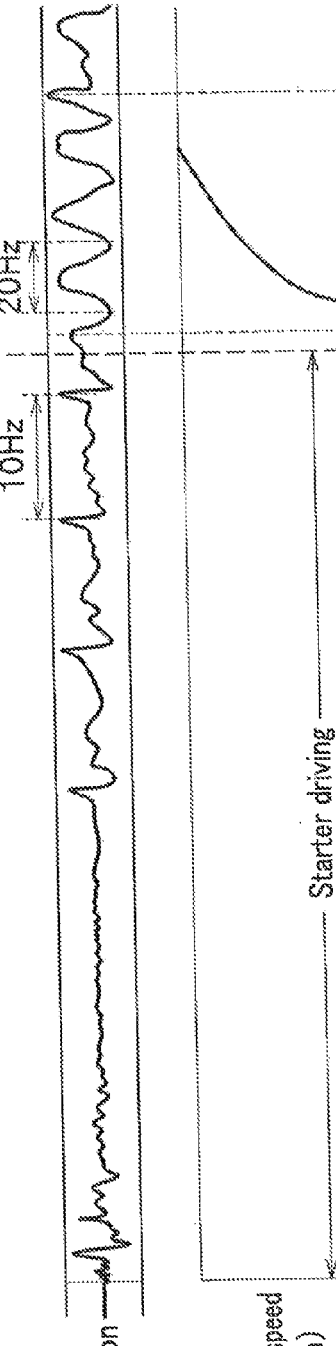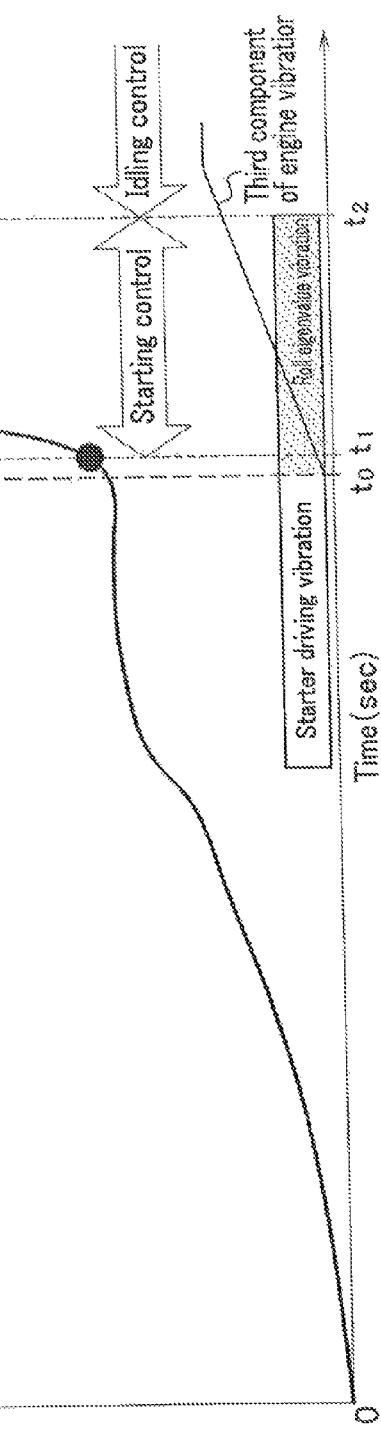

ACTIVE VIBRATION ISOLATING SUPPORT APPARATUS

CROSS REFERENCE TO RELATED APPLICATIONS

This application is a divisional of application Ser. No. 12/228,161, filed Aug. 8, 2008, which claims the foreign priority benefit under 35 U.S.C. §119 of the filing date of Japanese patent application No. 2007-209438 filed on Aug. 10, 2007, Japanese patent application No. 2007-210077 filed on Aug. 10, 2007, and Japanese patent application No. 2007-211731 filed on Aug. 15, 2007, which are incorporated herein by reference.

FIELD OF THE INVENTION

The present invention relates to an active vibration isolating support apparatus to elastically support an engine in a vehicle body, and method for controlling the same.

DESCRIPTION OF THE RELATED ART

For example, JP 2007-107579 A ([0022]-[0025]) discloses an active vibration isolating support apparatus for controlling vibration of an engine by driving an actuator of a vibration isolating support unit to extend and contract based on estimation of phase and magnitude of the vibration of the engine using a crank pulse sensor. According to the prior art disclosed in JP 2007-107579 A ([0022]-[0025]), it is possible to sample a crank pulse to estimate the vibration of the engine from a variation in crank pulse intervals. Further, based on the result, it is possible to have an effective vibration isolating performance to drive an actuator of a vibration isolating support unit to extend and contract for stationary vibrations such as an idling state, or constant speed traveling, etc.

However, for short-term vibrations (transient vibrations), it is impossible to reduce transient vibrations by determining the vibration of the engine from variation in crank pulse intervals because controlling is too slow. Therefore, for example, JP 2006-017288 A ([0026], and FIG. 6) discloses an active vibration isolating support apparatus having effective vibration isolating performance for transient vibrations when an all-cylinder operation is changed to a selective-cylinder operation in an engine.

However, JP 2006-017288 A ([0026], and FIG. 6) discloses the apparatus in which changing between the all-cylinder operation and the selective-cylinder operation is detected to transiently correct estimation of vibration of an engine using correction values pre-stored as a map, and the basic idea for the apparatus is that the engine is in the stationary operation. That is, the control is performed at a constant cycle, the result of sampling a crank pulse at the first cycle is used in calculation for control in the next cycle, and the result of the calculation is used to control the extension and contraction of an actuator of a vibration isolating support unit in the next cycle. However, the beginning of control of extension and contraction of an actuator of a vibration isolating support unit, which occurs at the time of engine starting, is too slow to effectively reduce the temporary vibration such as a transient vibration.

Accordingly, it is an object of the present invention to provide an active vibration isolating support apparatus that can effectively reduce a transient vibration which occurs at the time of engine starting, etc., and method for controlling the same to.

SUMMARY OF THE INVENTION

In order to achieve the above object, in accordance with a first feature of the present invention, there is provided an active vibration isolating support apparatus for reducing vibration transmitted from an engine including: vibration isolating support units to elastically support the engine in a vehicle body each of which includes an actuator; and a control unit to estimate a vibrational state based on an output from a sensor for detecting a change in a revolution speed of the engine; in which the control unit drives the actuator to extend and contract so as to reduce transmission of vibration, and in which the control unit determines a detection of an initial explosion in the engine and drives the actuator of the vibration isolating support unit to extend and contract at a predetermined frequency if the estimated change rate in the revolution speed of the engine based on the output from the sensor is greater than or equal to a predetermined value after a time when engine starts.

According to the first feature of the present invention, when the change rate of the revolution change of the engine is greater than or equal to a predetermined value, the control unit determines a detection of an initial explosion in the engine, and promptly reduces transmission of vibration to a vehicle body rapidly.

According to a second feature of the present invention, in addition to the first feature, a reciprocating motion of a piston is converted to a rotary motion of a crankshaft in the engine, and the control unit controls the actuator of the vibration isolating support unit so as to reduce the transmission of roll vibration of the engine in a direction which is reverse to the rotation direction of the crankshaft of the engine if the initial explosion is determined to be detected after the time when the engine starts.

According to the second feature of the present invention, in order to reduce the vibration of the engine in which the reciprocating motion of the piston is converted to the rotary motion of the crankshaft, the control unit controls the actuator of the vibration isolating support unit so as to reduce the roll vibration of the engine in the direction which is reverse to the rotation direction of the crankshaft when it is determined that the initial explosion is detected after the time when the engine starts, and the roll vibration occurring at the time of engine starting can be reduced.

According to a third feature of the present invention, in addition to the first feature, the vibration isolating support units are disposed on opposite sides of the crankshaft, and the control unit drives the actuator of one of the vibration isolating support units to contract, the one of the vibration isolating support units is compressed by roll vibration associated with the initial explosion.

According to the third feature of the present invention, since the actuator of one vibration isolating support unit, which is compressed by the roll vibration associated with the initial explosion in the engine, of vibration isolating support units disposed on the opposite sides of the crankshaft is driven to contract, the roll vibration occurring at the time of engine starting can be reduced.

According to a fourth feature of the present invention, in addition to any one of the first feature to third feature, the control unit drives the actuator of the vibration isolating support unit to extend and contract at a natural vibration frequency determined by the engine and the vibration isolating support unit if the initial explosion is determined to be detected after the time when the engine starts.

According to the fourth feature of the present invention, since the actuator of the vibration isolating support unit is driven to extend and contract at a natural vibration frequency determined by the engine and elastic supporting of the engine, natural vibration determined by the engine and elastic supporting of the engine is reduced to be transmitted to the vehicle body at the time of engine starting.

According to a fifth feature of the present invention, in addition to the fourth feature, the control unit includes the initial explosion determining unit to determine the detection of an initial explosion in the engine; and a change detector to detect the magnitude of change in the revolution speed of the engine; and an elapsed time from the initial explosion to a predetermined revolution speed in the engine is measured, and a magnitude and period of vibration at the natural vibration frequency of the engine is estimated based on the elapsed time.

According to the fifth feature of the present invention, depending on the magnitude of the revolution change after the initial explosion in the engine, the magnitude and period of transient vibration of the engine after the initial explosion can be estimated.

Further, for example, the vehicle engine is so configured that the frequency of vibration caused by low engine revolution speed at the time of engine starting is equal to the natural vibration frequency. Therefore, the vibration generated at the natural vibration frequency after the initial explosion exhibits a transient vibration generated at the time of engine starting.

According to a sixth feature of the present invention, in an active vibration isolating support apparatus for reducing vibration transmitted from an engine, in which a reciprocating motion of a piston is converted to a rotary motion of a crankshaft is supported via vibration isolating support units in a vehicle body each of which includes an actuator, the active vibration isolating support apparatus includes: a control unit to make the actuator to extend and contract periodically depending on a vibrational state of the engine, thereby reducing transmission of vibration of the engine to a vehicle body, wherein the control unit controls the actuator of the vibration isolating support unit so as to reduce transmission of roll vibration of the engine in a direction which is reverse to the rotation direction of the crankshaft of the engine if the initial explosion is determined to be detected after a time when the engine starts.

According to the sixth feature of the present invention, in order to reduce the vibration of the engine in which the reciprocating motion of a piston is converted to the rotary motion of a crankshaft, the control unit controls the actuator of the vibration isolating support unit so as to reduce roll vibration of the engine in a direction which is reverse to the rotation direction of the crankshaft when it is determined that the initial explosion is detected at the time of engine starting, and roll vibration occurring at the time of engine starting can be reduced.

According to a seventh feature of the present invention, in an active vibration isolating support apparatus for reducing vibration transmitted from an engine, in which vibration isolating support units elastically support the engine in a vehicle body each of which includes an actuator, the active vibration isolating support apparatus includes: a control unit to estimate a vibrational state of the engine based on a magnitude of change in a revolution speed of the engine to drive the actuator to extend and contract so as to reduce transmission of vibration, the control unit includes: an initial explosion determining unit to determine a detection of an initial explosion in the engine; and a change detector to detect the magnitude of change in the revolution speed of the engine; in which an elapsed time from the initial explosion to the predetermined revolution speed in the engine is measured, and a magnitude and period of vibration at the natural vibration frequency of the engine is estimated based on the elapsed time.

According to the seventh feature of the present invention, depending on the magnitude of revolution change after the initial explosion in the engine, magnitude and period of transient vibration of the engine after the initial explosion can be estimated.

Further, for example, the vehicle engine is so configured that the frequency of vibration caused by low engine revolution speed at the time of engine starting is equal to the natural vibration frequency. Therefore, the vibration generated at the natural vibration frequency after the initial explosion exhibits a transient vibration generated at the time of engine starting.

According to an eighth feature of the present invention, there is provided an active vibration isolating support apparatus for reducing vibration transmitted from an engine including: vibration isolating support units to elastically support the engine in a vehicle body each of which includes an actuator; a control unit to estimate a vibrational state based on an output from a sensor for detecting change in a revolution speed of the engine; and a cylinder pressure sensor to detect cylinder pressure in the engine, wherein the control unit determines an initial explosion in the engine with the cylinder pressure sensor at a time of engine starts, and drives the actuator to extend and contract at a predetermined fixed frequency.

According to the eighth feature of the present invention, since the control unit determines an initial explosion in an engine and drives the actuator of the vibration isolating support unit to extend and contract at a natural vibration frequency determined by the engine and elastic supporting of the engine when a cylinder pressure sensor detects increasing in cylinder pressure associated with the initial explosion, natural vibration determined by the engine and elastic supporting of the engine is reduced to be transmitted to the vehicle body at the time of engine starting.

According to a ninth feature of the present invention, there is provided a method for controlling an vibration isolating support units to elastically support the engine in a vehicle body each of which includes an actuator; the method including the steps of: estimating a vibrational state based on an output from a sensor for detecting change in a revolution speed of the engine; determining a detection of an initial explosion in the engine if the estimated change in the revolution speed of the engine based on the output from the sensor is greater than or equal to a predetermined value at a time of engine starts; and driving the actuator of the vibration isolating support unit to extend and contract at a natural vibration frequency determined by the engine and the vibration isolating support unit.

According to a tenth feature of the present invention, in addition to the ninth feature, the method further includes the steps of: determining the detection of the initial explosion in the engine via an initial explosion determining unit; measuring an elapsed time from the initial explosion to a predetermined revolution speed of the engine; detecting a magnitude of change in the revolution speed of the engine based on the measured elapsed time; and estimating a magnitude and period of vibration at the natural vibration frequency of the engine based on the detected magnitude of change in the revolution speed of the engine.

According to the tenth feature of the present invention, it is possible to determine the detection of an initial explosion in an engine, and possible to calculate magnitude of revolution change after the initial explosion. It is also possible to estimate the magnitude and period of transient vibration at the time of engine starting based on magnitude of revolution change.

According to the present invention, an active vibration isolating support apparatus to reduce the transient vibration occurring at the time of engine starting, and a method for controlling the same can be provided.

BRIEF DESCRIPTION OF THE DRAWINGS

The object and features of the present invention will become more readily apparent from the following detailed description taken in conjunction with the accompanying drawings in which:

FIG. 9A is an illustration showing an engine ignition timing at a starting of an engine;

FIG. 9B is an illustration showing crank pulses at the starting of the engine;

FIG. 9C is an illustration showing an engine vibration at the starting of the engine;

FIG. 9D is an illustration showing a time dependence of an engine revolution speed NE at the starting of the engine;

DESCRIPTION OF PREFERRED EMBODIMENTS

Hereinafter, with reference to FIGS. 1-19, preferred embodiments of the present invention will be described.
<First Embodiment>

First, an active vibration isolating support apparatus according to the first embodiment of the present invention will be explained.

(Whole Structure of the Active Vibration Isolating Support apparatus)

Figure 1A:
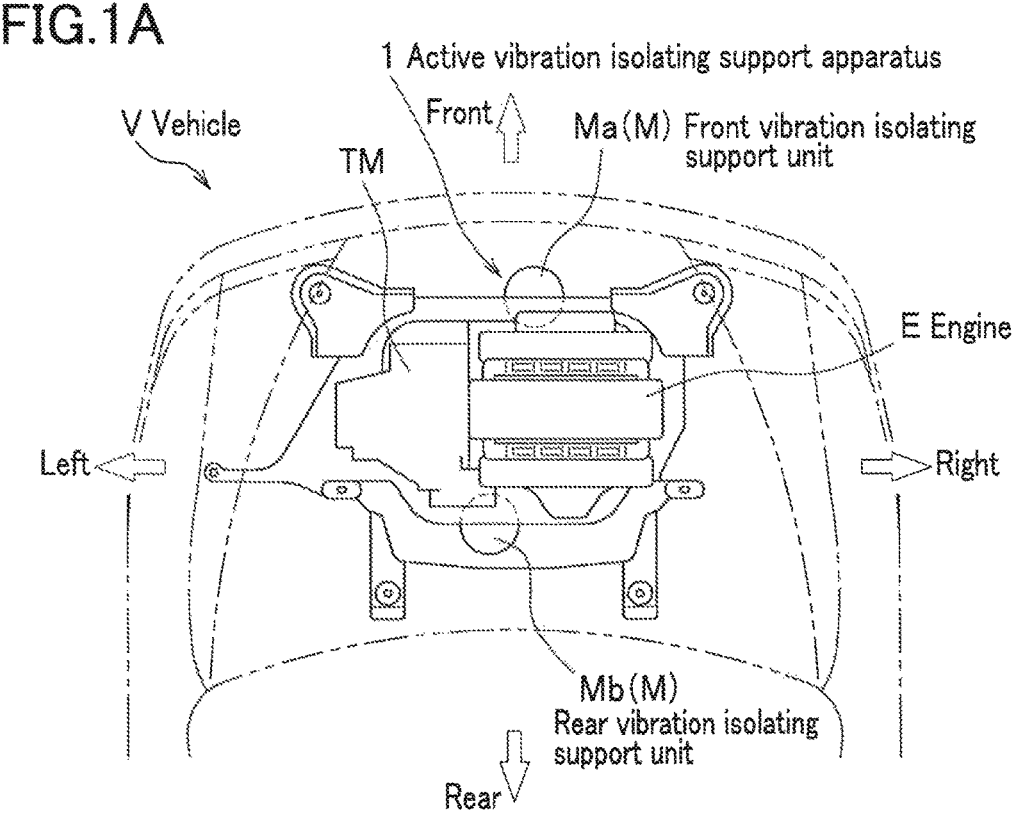
FIG. 1A is a plan view showing an engine mounting in a vehicle to which an active vibration isolating support apparatus according to a first embodiment of the present invention is applied.
Figure 1B:
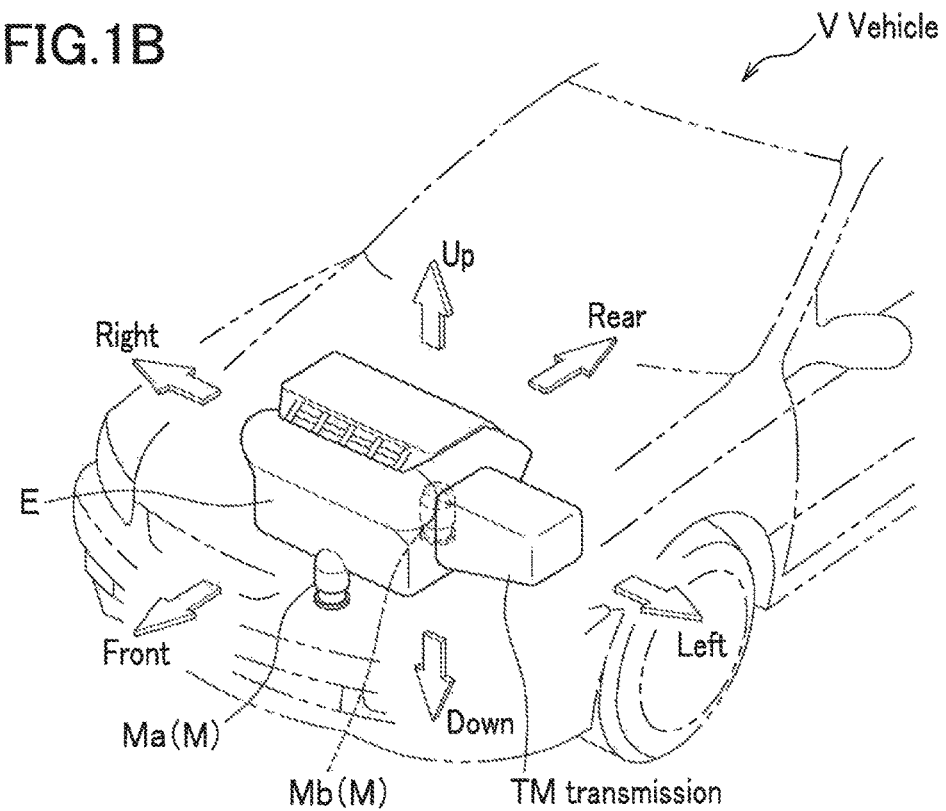
FIG. 1B is a perspective view showing the engine mounting in the vehicle to which the active vibration isolating support apparatus according to the first embodiment is applied.

In FIG. 1A and FIG. 1B, an active vibration isolating support apparatus 1 according to the present invention can be driven to extend and contract in a vertical direction, and includes two engine mounts (active control mounts) M which are used to elastically support an engine E of a vehicle V in a vehicle body frame, and are disposed ahead of and behind the engine E. Hereinafter, an "engine mount" is referred to as a "vibration isolating support unit".

Here, the engine E is a so-called side-ways mounted transversal V engine with six-cylinders in which one end of a crankshaft (not shown) is connected to a transmission TM, and the crankshaft is disposed in a direction transverse to a body of the vehicle V. Therefore, the engine E is disposed in a direction so that the crankshaft is disposed in the direction transverse to the body of the vehicle V, and the vibration isolating support units M are disposed ahead of and behind the engine E to reduce a roll vibration. Hereinafter, the vibration isolating support unit M disposed ahead of the engine E of the vehicle V is referred as a "front vibration isolating support unit Ma", and the vibration isolating support unit M behind the engine E is referred as a "rear vibration isolating support unit Mb".

The front vibration isolating support unit Ma and the rear vibration isolating support unit Mb are mounted on a location below the center of gravity of the engine E to reduce the roll vibration in a front-rear direction of the engine E, and to elastically support the engine E in the vehicle body of the vehicle V.

Figure 2:
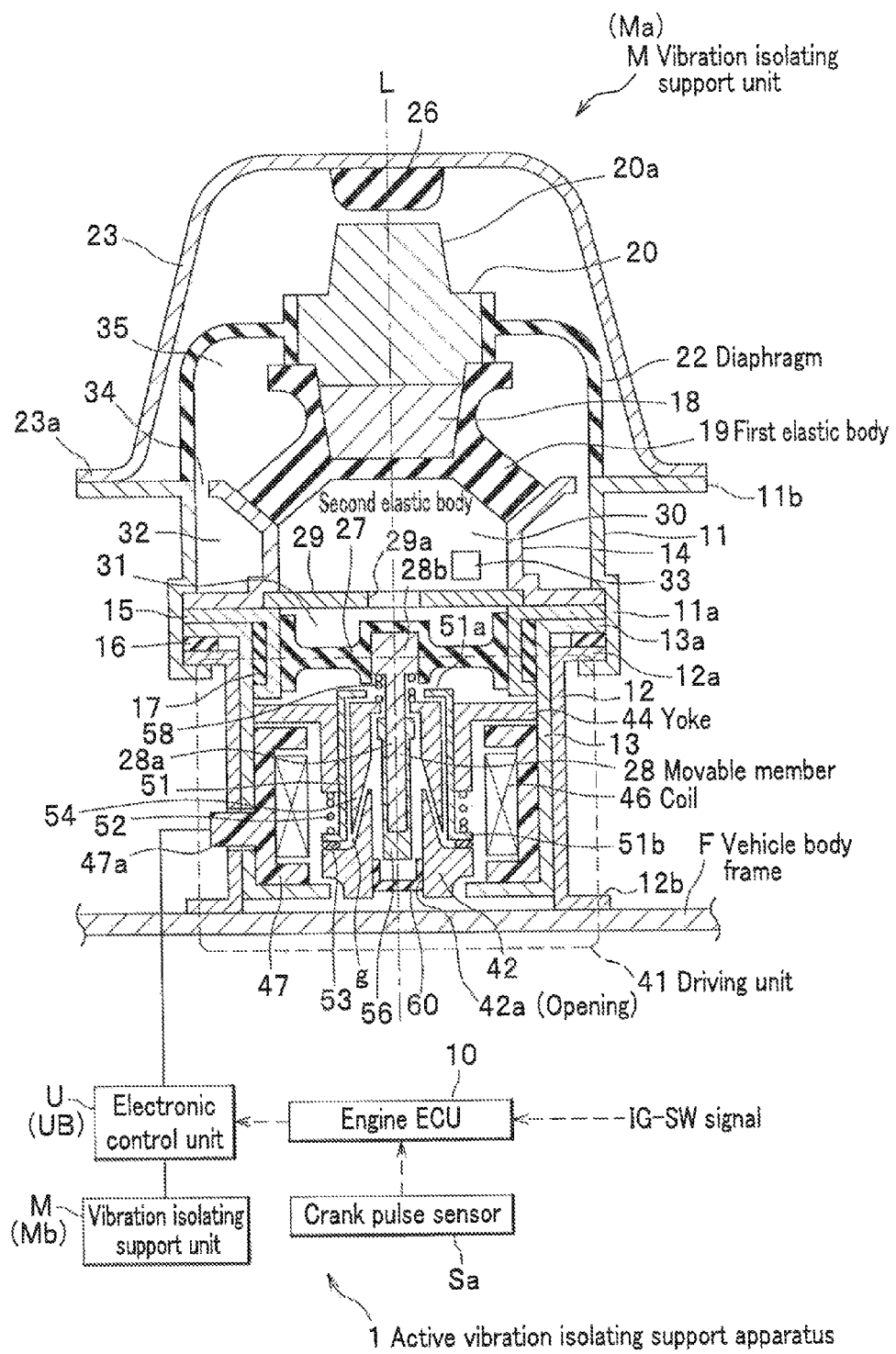
FIG. 2 is a longitudinal cross sectional view showing a structure of an active control mount of an active vibration isolating support apparatus according to the first embodiment.

As shown in FIG. 2, the active vibration isolating support apparatus 1 includes an active control mount electronic control unit U to control the vibration isolating support unit M. Hereinafter, the active control mount electronic control unit U is referred to as an "electronic control unit U".

It is noted that the electronic control unit U corresponds to the "control unit".

The electronic control unit U is connected to an engine control ECU 10 (hereinafter, referred to as an "engine ECU 10") to control revolution speed or output torque, etc. of the engine E via communication lines.

Further, the electronic control unit U receives an engine revolution speed NE signal, crank pulse signals, TDC (Top Dead Center) signals to exhibit timing of the top dead centre for each cylinder, a cylinder-off signal to exhibit either an all-cylinder operation or a selective-cylinder operation, and an ignition switch signal (hereinafter, referred to as an "IG-SW signal") from the engine ECU 10.

For reference's sake, in the case of the six-cylinder engine, the crank pulse is output 24 times per revolution of the crankshaft, that is, once every 15 degrees of a crank angle from a crank pulse sensor Sa (Structure of the Vibration Isolating Support Unit)

As shown in FIG. 2, the vibration isolating support unit Ma has a structure that is substantially symmetrical with respect to an axis L, and mainly includes a substantially cylindrical upper housing 11, a substantially cylindrical lower housing 12 disposed below the housing 11, an upwardly opening substantially cup-shaped actuator case 13 housed in the lower housing 12, a diaphragm 22 connected to the upper housing 11, an annular first elastic body support ring 14 housed in the upper housing 11, and a first elastic body 19 connected to the first elastic body support ring 14, etc.

Between a flange unit 11a at a lower end of the upper housing 11 and a flange unit 12a at an upper end of the lower housing 12, a flange unit 13a on the outer periphery of the actuator case 13, an outer peripheral unit of the first elastic body support ring 14, and an outer peripheral unit of an annular second elastic body support ring 15 disposed on an upper side in the actuator case 13 are superimposed and joined by caulking. In this process, an annular first floating rubber 16 is disposed between the flange unit 12a and the flange unit 13a, and an annular second floating rubber 17 is disposed between an upper part of the actuator case 13 and an outer face of the second elastic body support ring 15, so that the actuator case 13 is floatingly supported such that it can move up and down relative to the upper housing 11 and the lower housing 12.

The first elastic body support ring 14, and a first elastic body support boss 18 disposed in a concave unit provided on an upper side of a first elastic body 19 are joined by vulcanization bonding at the lower and upper ends of the first elastic body 19 made of a thick rubber. Further, a diaphragm support boss 20 is fixed to an upper face of the first elastic body support boss 18 by a bolt (not shown). An outer peripheral unit of the diaphragm 22 whose inner peripheral unit is joined by vulcanization bonding to the diaphragm support boss 20, is joined by vulcanization bonding to the upper housing 11.

An engine mounting unit 20a integrally formed with an upper face of the diaphragm support boss 20 is fixed to the engine E (see FIG. 1). (Detailed method for fixing is not shown.) Also, a vehicle body mounting unit 12b at the lower end of the lower housing 12 is fixed to a vehicle body frame F.

A flange unit 23a at the lower end of a stopper member 23 is joined to a flange unit 11b by bolts and nuts (not shown) at the upper end of the upper housing 11. The engine mounting unit 20a faces a stopper rubber 26 attached to an upper inner face of the stopper member 23 so that the engine mounting unit 20a can touch the stopper rubber 26.

By such a structure, when a large load is input from the engine E (see FIG. 1) to the vibration isolating support unit M, the engine mounting unit 20a touches the stopper rubber 26, thereby reducing excessive displacement of the engine E.

An outer peripheral unit of a second elastic body 27 made of an elastic body such as a membranous rubber is joined to the inner peripheral face of the second elastic body support ring 15 by vulcanization bonding. At a radial center portion of the second elastic body 27, a movable member 28 is joined by vulcanization bonding so that the upper unit thereof (head unit 28b) is embedded in.

And, disc-shaped partition member 29 is fixed between the upper face of the second elastic body support ring 15 and the lower unit of the first elastic body support ring 14. A first liquid chamber 30 defined by the first elastic body support ring 14, the first elastic body 19, and the partition member 29, and a second liquid chamber 31 defined by the partition member 29 and the second elastic body 27, communicate with each other via a through hole 29a formed in the center of the partition member 29.

Also, an annular communication passage 32 is formed between the first elastic body support ring 14 and the upper housing 11. The communication passage 32 communicates with the first liquid chamber 30 via a through hole 33, and communicates via a through gap 34 with a third liquid chamber 35 defined by the first elastic body 19 and the diaphragm 22.

Next, the structure of a driving unit (actuator) 41 (illustrated by the phantom lines) housed in the actuator case 13 will be explained.

As shown in FIG. 2, the driving unit 41 mainly includes a stationary core 42 made of a metal or an alloy having high magnetic permeability, a yoke 44, a movable core 54, a coil 46 of an electromagnet, and a coil cover 47 covering an outer periphery of the coil 46. The stationary core 42 has a substantially cylindrical shape, and has a flange for receiving a washer at its lower end. The outer circumference of the cylindrical unit has a conical shape. The movable core 54 has a substantially cylindrical shape. The upper end of the movable core 54 projects in the inner peripheral direction to form a spring seat. The inner circumference of the cylindrical unit has a conical shape.

A connector unit 47a integrally formed with the coil cover 47 extends to an outside through the openings in the actuator case 13 and the lower housing 12. Electrical wires for supplying power to the coil 46 are connected to the connector unit 47a.

The yoke 44 has an annular flange on the upper side of the coil cover 47, and has a cylindrical unit extending from the inner peripheral unit of the flange downward. The yoke 44 has, as it were, a shape of a cylinder having a flange. A thin cylindrical bearing member 51 is fitted, in a vertically slidable manner, into an inner peripheral face of a cylindrical unit 44a of the yoke 44. An upper flange 51a and a lower flange 51b are formed respectively at the upper and lower ends of the bearing member 51, the upper flange 51a being bent radially inward, the lower flange 51b being bent radially outward.

A set spring 52 is disposed in a compressed state between the lower flange 51b and the lower end of the cylindrical unit 44a of the yoke 44. The bearing member 51 is supported by the yoke 44 through the lower flange 51b being pressed against the upper face of the stationary core 42 via an elastic body 53 disposed between the lower face of the lower flange 51b and the stationary core 42 by means of the elastic force of the set spring 52.

The substantially cylindrical movable core 54 is fitted, in a vertically slidable manner, into an inner peripheral face of the bearing member 51. Further, the stationary core 42 and the movable core 54 have hollow center portions along the axis L respectively, and a rod 28a of the movable member 28 is disposed there. The movable member 28 includes the rod 28a, and a head unit 28b disposed at an upper end of the rod 28a and having an outer diameter greater than that of the rod 28a, and a nut 56 is tightened around a lower end of the rod 28a. The nut 56 has a hollow portion at its center, the upper end of the hollow unit opens upward, receives the lower end of the rod 28a in the hollow unit, and its upper end touches the lower face of the spring seat. The outer diameter of the spring seat is relatively large. The upper face of the spring seat is the movable core 54.

Also, a set spring 58 is disposed in a compressed state between the spring seat provided on an upper face of the movable core 54 and a lower face of the head unit 28b. The lower face of the spring seat of the movable core 54 is fixed by being pressed against the upper end of the nut 56 by means of the elastic force of the set spring 58. In this state, the conical inner peripheral unit of the cylindrical unit of the movable core 54 and the conical outer peripheral unit of the stationary core 42 face each other across a conical air gap g.

The rod 28a and the nut 56 are loosely fitted into an opening 42a formed in the center of the stationary core 42, and this opening 42a of the hollow unit is closed by a rubber cup 60.

The operation of the vibration isolating support unit M configured as described above will be explained (hereinafter, see FIG. 2 if necessary).

The engine shake vibration is caused by a resonance between the vehicle body and the engine system in a coupled system including the engine, the vehicle body, and a suspension. When low frequency (for example, 7-20 Hz) engine shake vibration occurs while the vehicle V is traveling, the first elastic body 19 is deformed by a load input from the engine E via the diaphragm support boss 20 and the first elastic body support boss 18, thus changing the capacity of the first liquid chamber 30, so that a liquid moves to and fro between the first liquid chamber 30 and the third liquid chamber 35 via the communication passage 32. In this state, when the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. At this time, the shape and the dimensions of the communication passage 32 and a spring constant of the first elastic body 19 are set so that a low spring constant and high attenuation force are exhibited in the frequency region of the engine shake vibration. Therefore, it is possible to effectively reduce the vibration transmitted from the engine E to the vehicle body frame F.

Further, in the frequency region of the engine shake vibration, when the engine E is in a stationary rotating state, the driving unit 41 of the vibration isolating support unit M is maintained in a non-operating state.

When there is a vibration having a frequency higher than that of the above-mentioned engine shake vibration, that is, a vibration during idling or vibration during a selective-cylinder operation due to the rotation of crankshaft (not shown) of the engine E, the liquid within the communication passage 32 providing a communication between the first liquid chamber 30 and the third liquid chamber 35 becomes stationary and a vibration isolating function cannot be exhibited; the driving unit 41 of the vibration isolating support unit M is therefore driven to exhibit a vibration isolating function. For reference's sake, the idle vibration is caused by low-frequency vibrations of a floor, seats, and a steering wheel during idling. For example, a BURUBURU vibration is caused in a four-cylinder engine in a range of 20-35 Hz, and in a six-cylinder engine in a range of 30-50 Hz, and a YUSAYUSA vibration is caused in a range of 5-10 Hz by an uneven combustion, and is a main factor of the roll vibration in an engine.

Therefore, in order to drive the driving unit 41, the active vibration isolating support apparatus 1 (see FIG. 1) including the vibration isolating support unit M shown in FIG. 2 is provided with the crank pulse sensor Sa to detect the crank pulse of the engine E, the engine ECU 10, and the electronic control unit U.

(Configuration of Electronic Control Unit)

Figure 3:
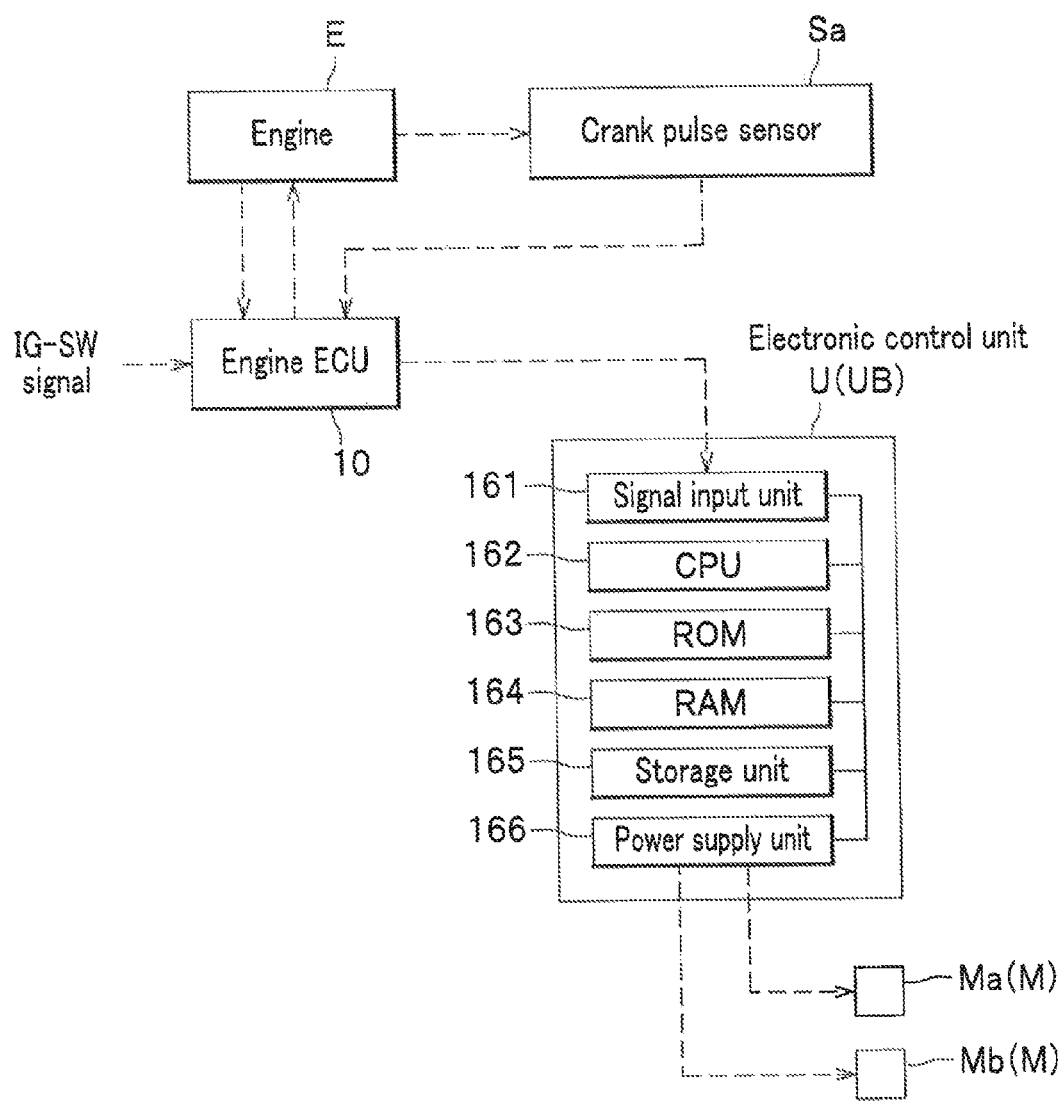
FIG. 3 is a block diagram showing connections of a crank pulse sensor, an engine ECU, and an electronic control unit.

FIG. 3 is a block diagram showing the interconnection among a crank pulse sensor, an engine ECU, and an electronic control unit.

The crank pulse sensor Sa detects a crank pulse generated by a crankshaft (not shown) of the engine E. In the case of a six-cylinder engine, the crank pulse is generated every 15 degrees of a crank angle in the engine E, and the crank pulse sensor Sa detects this crank pulse to send it to the engine ECU 10.

The engine ECU 10 includes a microcomputer having CPU (Central Processing Unit) (not shown), ROM (Read Only Memory), RAM (Random Access Memory), and peripheral circuitry so as to control the revolution speed of the engine E, and to detect the revolution speed of the engine E via a revolution speed sensor (not shown) provided with the engine E. The engine ECU 10 also has an ability to send the detected revolution speed and the crank pulse from the crank pulse sensor Sa to the electronic control unit U.

The electronic control unit U includes a microcomputer having CPU 162, ROM 163, RAM 164, peripheral circuit, etc. Also, the electronic control unit U is provided with a signal input unit 161 to receive signals such as the engine revolution speed NE and the crank pulse, etc. from the engine ECU 10.

Further, the electronic control unit U is provided with a power supply unit 166 including a switching circuit (not shown) to supply current to the coil 46 (see FIG. 2) provided with each of the front vibration isolating support unit Ma and the rear vibration isolating support unit Mb. The switching circuit of the power supply unit 166 is controlled by the CPU 162, and is capable of supplying direct-current supplied from a battery to the power supply unit 166 to the coil 46 (see FIG. 2) via a connector unit 47a (see FIG. 2). Also, the electronic control unit U is operated in accordance with a program stored in, for example, the ROM 163.

Also, the electronic control unit U is provided with a storage unit 165 such as a flash memory so as to store requested data to control the vibration isolating support unit M.

In the driving unit 41 of the vibration isolating support unit M configured as shown in FIG. 2, when current does not flow through the coil 46, the movable member 28 is moved upwardly by elastic restorative force of the second elastic body 27. Also, the nut member 25 pushes the movable core 54 up to form the gap g between the movable core 54 and the stationary core 42.

On the other hand, when current is supplied from the electronic control unit U to the coil 46, magnetic flux lines generated by the coil 46 pass through the yoke 44, the movable core 54, and the gap g in an up and down direction to form a closed circuit fed back to the stationary core 42 and the coil 46, thereby moving the movable core 54 downwardly by suction force. At this time, the movable core 54 moves the head unit 28b of the movable member 28 downwardly via the nut member 25 fixed to the rod 28a of the movable member 28 so as to deform the second elastic body 27 downwardly. As a result, since the capacity of the second liquid chamber 31 (see FIG. 2) increases, a liquid in the first liquid chamber 30 compressed by load from the engine E (see FIG. 1) flows into the second liquid chamber 31 through the through hole 29a of the partition member 29 to reduce load transmitted from the engine E to the vehicle V (see FIG. 1). When supplying current to the coil 46 is stopped, the movable core 54 is released from the downward suction force.

As described above, the electronic control unit U can control the vertical motion of the movable member 28 by switching on/off supply current to the coil 46 so as to reduce the roll vibration of the engine E.

(Engine Vibration at the Time of Engine Starting)

Next, as the feature of the present invention, reduction of transmission of vibration to a vehicle body at the time of starting of the engine E will be explained. In the prior art active vibration isolating support apparatus, a particular attention is paid to the fact that the engine vibration is absorbed when the engine is in a steady rotating state such as idling, or change from six-cylinder operation to three-cylinder operation, etc.

The active vibration isolating support apparatus 1 according to this embodiment (see FIG. 1A and FIG. 1B) elastically supports the engine E with vibration isolating support units M, and especially reduces transmission of roll eigenvalue vibration occurring at the time of engine starting to the vehicle body by driving the driving unit 41 (see FIG. 2) of the vibration isolating support unit M to extend and contract.

When the engine E is started with a starter, for a period of time after starting of the engine E (hereinafter, beginning self-revolution by cylinder explosion triggered by ignition referred as to "starting"), until the revolution speed arrives at that of idling state, the vibration of the engine E consist mostly of vibrations having natural vibration frequencies (roll eigenvalues) determined by the weight of the engine E (including the weight of the transmission TM) and the spring constants of the vibration isolating support unit M (engine mount M).

Also, when an engine revolution speed NE in which an ignition cycle (third component of engine vibration) coincides with the roll eigenvalue after starting of the engine E, a sympathetic vibration occurs and the magnitude of the vibration is maximized.

In the case of a V engine with six-cylinders, since cylinder explosion occurs three times per revolution of the crankshaft, vibration corresponding to the engine revolution speed NE is referred to as "third component of engine vibration". However, as the engine revolution speed NE increases, the frequency and magnitude of the third component of engine vibration increases. In contrast, the roll eigenvalue vibration determined by the natural vibration frequency decreases, and becomes to consist mostly of the third component of engine vibration near the engine revolution speed NE of the idling state.

Further, the roll eigenvalue vibration is generated in the rotation direction of the crankshaft, and in the case of a side-ways mounted engine, is generated in the fore and aft direction of the vehicle.

Also, for example, the roll eigenvalue vibration is generated when the crankshaft rotates unstably, for example, at the time of engine starting.

For reference's sake, in the case of a straight four engine, since cylinder explosion occurs two times per revolution of the crankshaft, vibration corresponding to the engine revolution speed NE is referred to as "second component of engine vibration". In the case of a three-cylinder operation, that is, selective-cylinder operation in a V engine with six-cylinders, since cylinder explosion occurs 1.5 times per revolution of the crankshaft, vibration corresponding to the engine revolution speed NE is referred to as "$1.5_{th}$ component of engine vibration".

Figure 4:
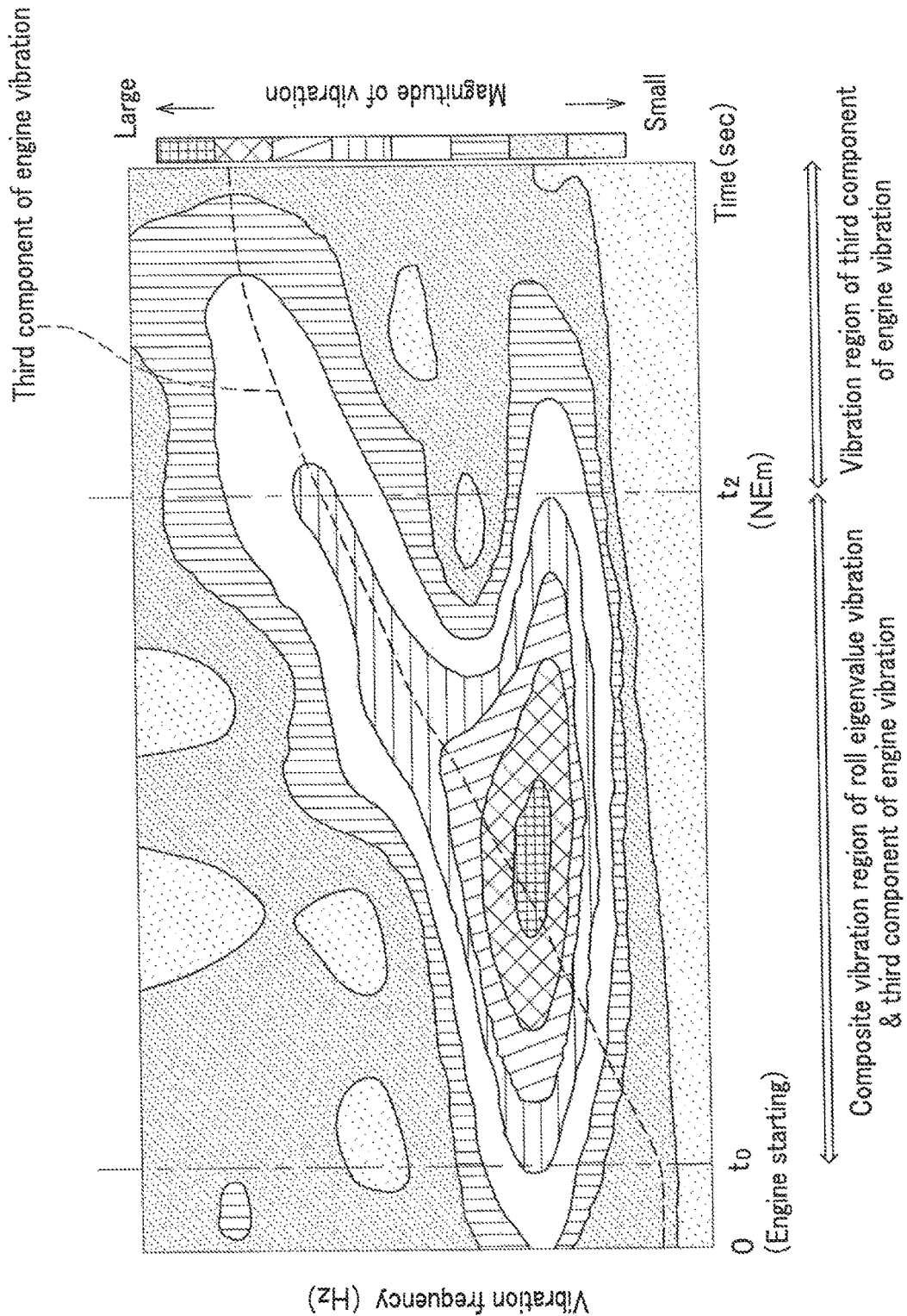
FIG. 4 is an illustration for explaining an analysis result which shows a time dependence of engine vibration characteristics at a starting of an engine.

FIG. 4 is an explanatory diagram showing an analysis result of time transient of engine vibration character at the time of engine starting. In FIG. 4, the vertical axis represents time (sec). The horizontal axis represents a vibration frequency (Hz). Also, magnitudes of vibrations are represented by different kinds of hatchings.

As shown in dashed lines, a vibration component of the "third component of engine vibration" is a composite vibration of the vibration at the above natural vibration frequency (roll eigenvalue) and third component of engine vibration component from to at which initial explosion occurs to start the engine E to $t_2$ at which a predetermined engine revolution speed NEm which is slightly below the idling state engine revolution speed NE is achieved. Also, when the engine revolution speed NE coincides with the above roll eigenvalue, the magnitude of the vibration is maximized.

After the time $t_2$, the third component of engine vibration becomes a principal component.

(Operation of Electronic Control Unit)

Figure 5:
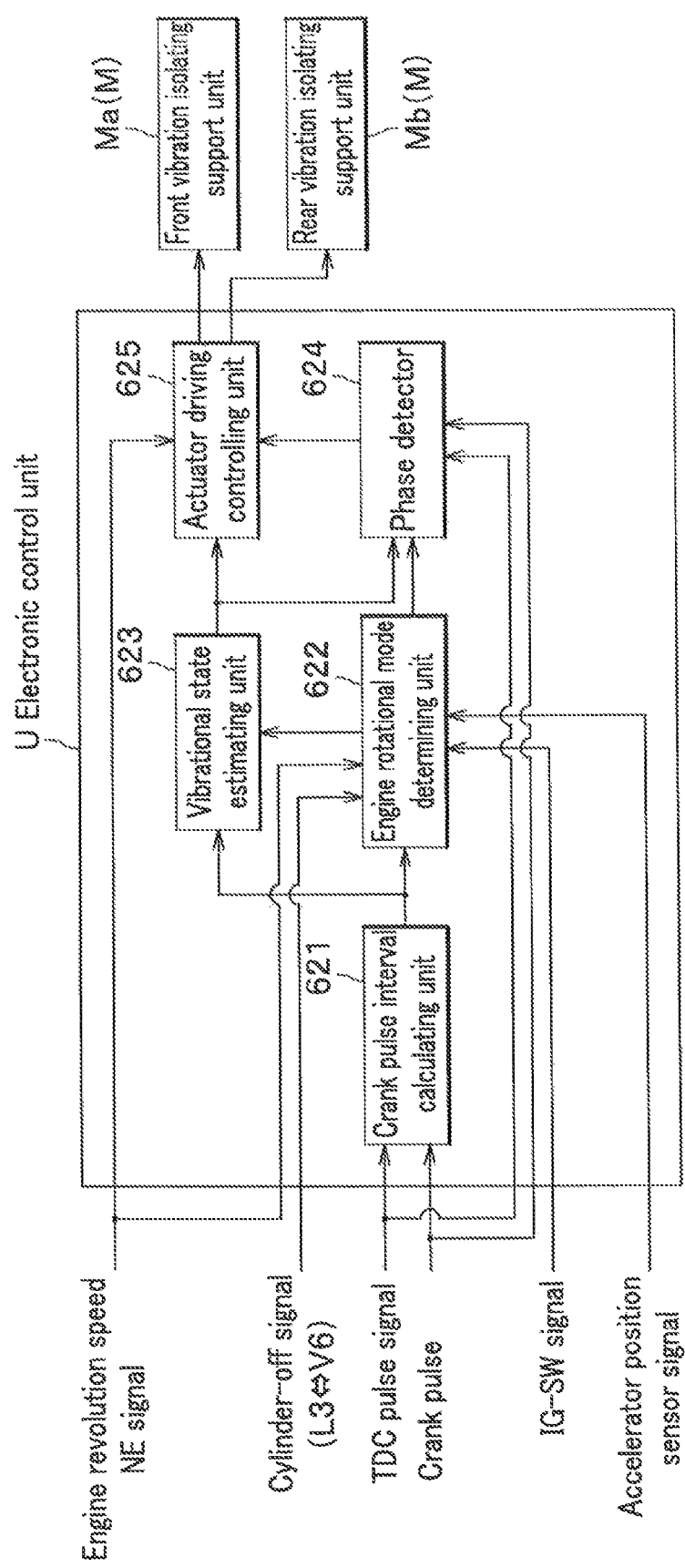
FIG. 5 is a functional block diagram of an electronic control unit according to the embodiment.
Figure 6:
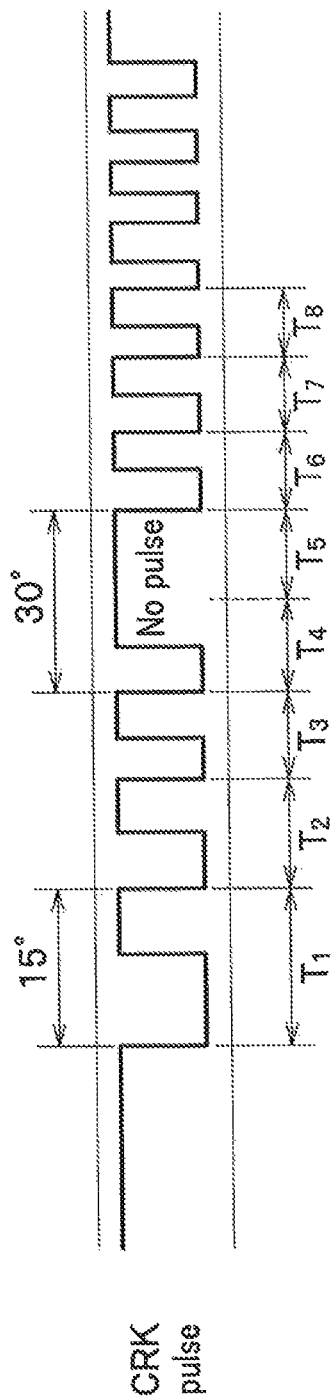
FIG. 6 is an illustration for explaining a calculation of a moving average of a crank pulse.
Figure 7:
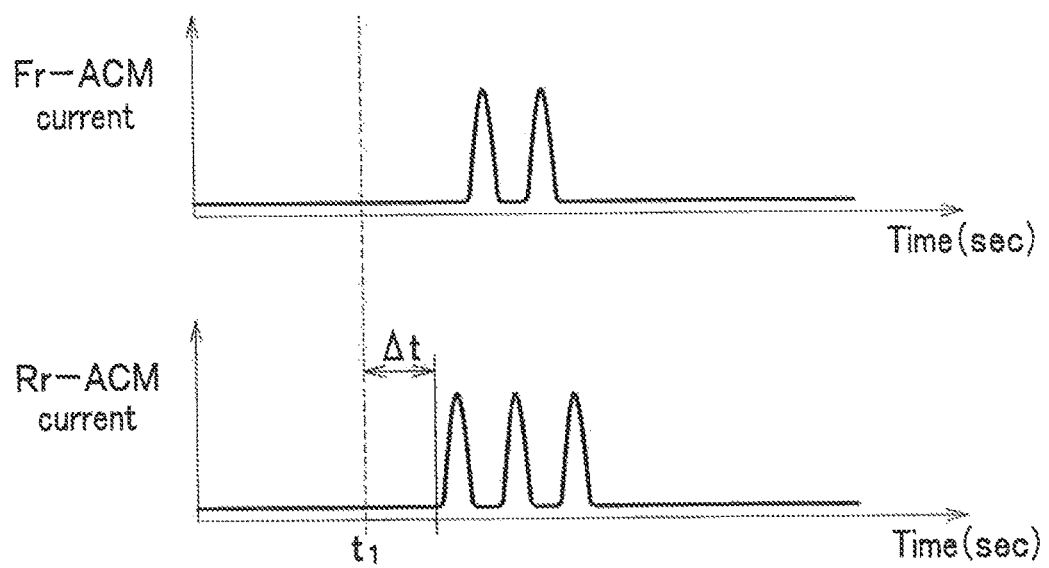
FIG. 7 is an illustration for explaining an output timing of a current for driving and controlling a driving unit of a front vibration isolating support unit and a rear vibration isolating support unit.

Referring to FIGS. 5-7, the operation of the electronic control unit U will be explained.

FIG. 5 is a block diagram of the electronic control unit U according to this embodiment. FIG. 6 is an explanatory diagram showing how to calculate a moving average of the crank pulse, and FIG. 7 is an explanatory diagram showing the timing of current output to drive the actuators of the front vibration isolating support unit and the rear vibration isolating support unit to extend and contract.

In FIG. 7, a Fr-ACM current means a current to drive the actuator of the front vibration isolating support unit Ma, and a Rr-ACM current means a current to drive the actuator of the rear vibration isolating support unit Mb.

The function of each functional block of the electronic control unit U is performed by the CPU 162 executing a computer program stored in the ROM 163 (see FIG. 3). More concretely, the electronic control unit U includes a crank pulse interval calculating unit 621, an engine rotational mode determining unit 622, a vibrational state estimating unit 623, a phase detector 624, and an actuator driving controlling unit 625.

The crank pulse interval calculating unit 621 calculates an interval of the crank pulse based on an internal clock signal of the CPU 162, a crank pulse signal and a TDC pulse signal from the engine ECU 10. Although the crank pulse signal (designated as "CRK pulse" in FIG. 6) is, as described above, output once every 15 degrees of crank angle, the crank pulse is not output for the top dead centre of a main cylinder, that is "no pulse" (see FIG. 6). Now, a crank pulse interval ($T_1$, $T_2$, $T_3$, $T_4$, $T_5$, $T_6$, $T_7$, or $T_8$ in FIG. 6) means one cycle of a square wave. Although a TDC pulse signal exists at the top dead centre of the main cylinder, the crank pulse signal is not generated. Therefore, the halved crank pulse interval for this crankshaft angle 30 degrees (($T_4+T_5$)/2) is calculated as the crank pulse interval.

The crank pulse interval calculated by the crank pulse interval calculating unit 621 is sent to the engine rotational mode determining unit 622 and the vibrational state estimating unit 623.

The engine revolution speed NE signal, the cylinder-off signal, the IG-SW signal, the accelerator position sensor signal, and the crank pulse interval are sent from the engine ECU 10 to the engine rotational mode determining unit 622.

The engine rotational mode determining unit 622 detects starting of the engine E to determine the rotational mode of the engine E as an active state, monitors increasing in the engine revolution speed NE, determines an idling state when the engine revolution speed NE is beyond the predetermined engine revolution speed NEm based on these signals, determines the operational state of the engine E as an all-cylinder operation state or a selective-cylinder operation state based on cylinder-off signal, and determines the idling state based on the accelerator position sensor signal.

The method for detecting the engine starting, that is, for detecting the revolution change of the engine E at the time of engine starting, will be explained in the flowchart for controlling the vibration isolating support unit at the time of engine starting in FIG. 8.

When the engine rotational mode determining unit 622 determines the rotational mode as an idling state, an all-cylinder operation state, or a selective-cylinder operation state, the vibrational state estimating unit 623 detects the revolution change of the crankshaft from the crank pulse interval based on the above determination, calculates the magnitude of engine vibration, and a cycle of an engine vibration from a peak-to-peak value of the revolution change, and sends the cycle and magnitude of the engine vibration, and timing of the peak value of the revolution change of the crankshaft, etc. to the actuator driving controlling unit 625 and the phase detector 624. At this time, the above values are sent according to a flag signal of the rotational mode of the engine E received from the engine rotational mode determining unit 622. That is, since the engine E is a V engine with six-cylinders, in the case of an all-cylinder operation, the vibration is estimated as third component of engine vibration, and in the case of selective-cylinder operation, the vibration is estimated as 1.5th component of engine vibration. Since the method for estimating this vibrational state is disclosed in, for example, "111 Development of active engine mount", JSAE Annual Congress (Autumn), Sep. 18, 2003, a detailed description will be omitted.

When the rotational mode determination from the engine rotational mode determining unit 622 means an engine active state (a period from the initial explosion to an idling state in the engine E), the vibrational state estimating unit 623 sends the cycle and magnitude of the predetermined natural vibration frequency (roll eigenvalue) prestored in the storage unit 165 to the actuator driving controlling unit 625 and the phase detector 624.

In the case of idling state, all-cylinder operation state, or selective-cylinder operation state, based on the peak-to-peak value of the revolution change of the crankshaft from the vibrational state estimating unit 623, the timing of peak of the revolution change, the crank pulse signal from the engine ECU 10, and a TDC pulse signal from each of the cylinder, the phase detector 624 compares the timing of peak of revolution change of the crankshaft and the timing of TDC, calculates the phase, and sends the phase to the actuator driving controlling unit 625.

The actuator driving controlling unit 625 receives the phase, and based on the engine revolution speed NE signal, combines an ensemble of duty signals in a driving cycle in accordance with the third component of engine vibration, or the 1.5th component of engine vibration. Next, the actuator driving controlling unit 625 controls the driving unit 41 (see FIG. 2) to extend and contract based on a phase calculated from the reference pulse per TDC so as to control each vibration of the front vibration isolating support unit Ma and the rear vibration isolating support unit Mb in each cycle thereof to cancel the engine vibration.

For reference's sake, JP 2002-139095 A ([0030]-[0031], and FIGS. 5-6) discloses this control performed by the actuator driving controlling unit 625 using an ensemble of duty signals in a driving cycle.

Next, each function of the phase detector 624 and the actuator driving controlling unit 625 in the case that the rotational mode determination from the engine rotational mode determining unit 622 is an engine active state (a period from the initial explosion to idling state in the engine E), will be explained.

In that case, based on the cycle of the predetermined natural vibration frequency (roll eigenvalue) from the vibrational state estimating unit 623, the crank pulse signal from the engine ECU 10, and the TDC pulse signals of each cylinders, the phase detector 624 delays the phase by a predetermined time difference $\Delta t$ from the timing $t_1$ at which it is determined that the initial explosion occurs to start the engine E (see FIG. 7), and sends the phase to the actuator driving controlling unit 625 so as to send the phase to, for example, the rear vibration isolating support unit Mb, and so as to send the half-cycle-delayed phase to the front vibration isolating support unit Ma. For example, $\Delta t$ may be preset.

The actuator driving controlling unit 625 receives the above phases, and combines the ensemble of duty signals in a driving cycle. Next, the actuator driving controlling unit 625 controls the driving unit 41 at a fixed cycle so as to control each vibration of the front vibration isolating support unit Ma and the rear vibration isolating support unit Mb in every each cycles thereof to cancel the engine vibration.

(Control Flow of Vibration Isolating Support Unit at the Time of Engine Starting)

Figure 8:
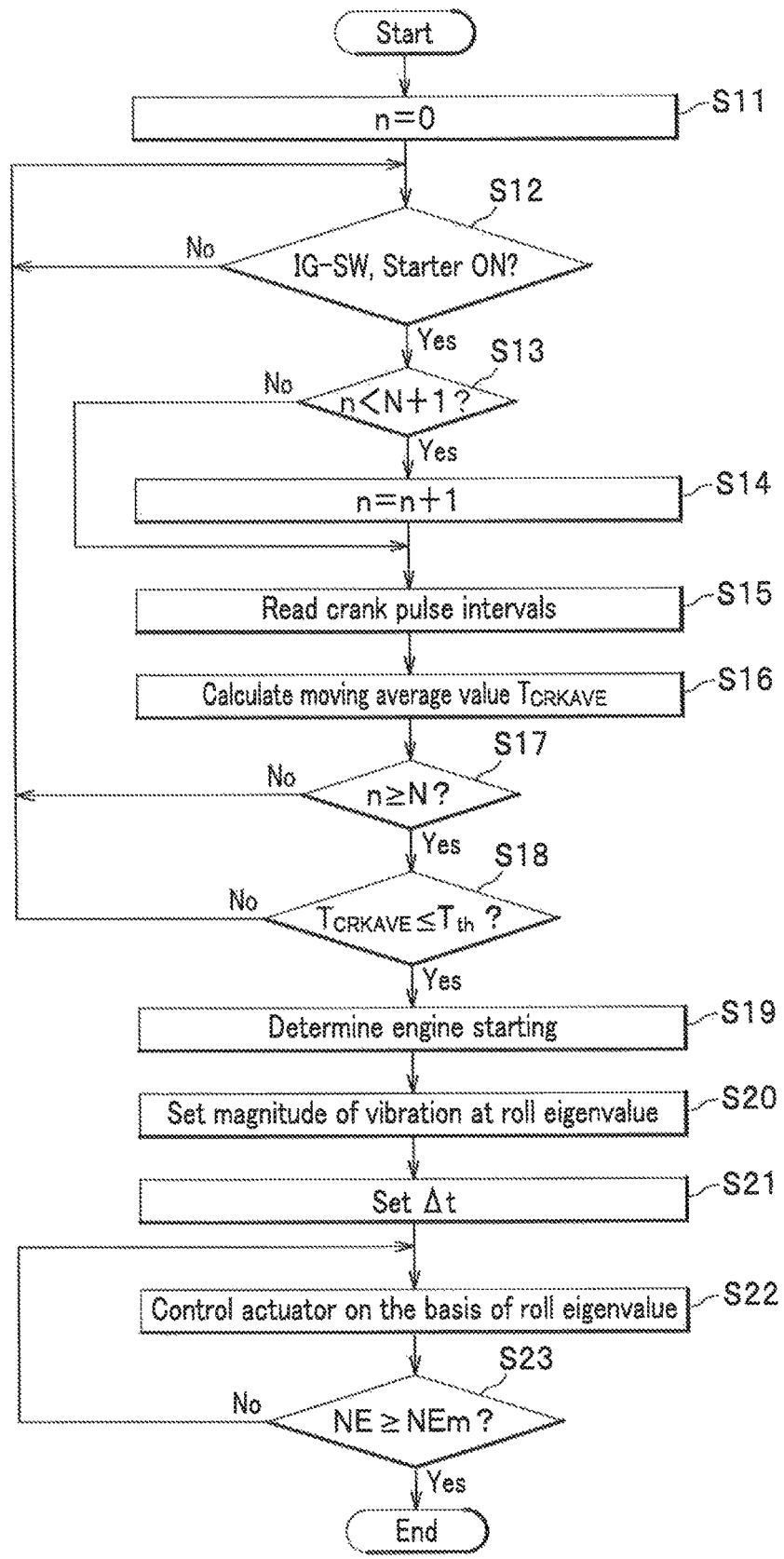
FIG. 8 is a flowchart showing a flow of a vibration isolating support unit control at a starting of an engine.

Referring to FIGS. 8-9, the flow of vibration isolating support unit control at the time of engine starting will be explained. If necessary, see FIG. 3, and FIGS. 5-7. FIG. 8 is a flowchart of a vibration isolating support unit control at the time of engine starting, and FIG. 9 is a diagram showing the engine ignition timing at the time of engine starting, a crank pulse, an engine vibration, and the time transient of an engine revolution speed NE.

This vibration isolating support unit control is performed in the engine rotational mode determining unit 622, the vibrational state estimating unit 623, the phase detector 624, and the actuator driving controlling unit 625 of CPU 162 (see FIG. 3) at a constant interval. During the constant interval, the crank pulse interval calculating unit 621 receives the crank pulse signal so as to calculate the crank pulse interval to send the crank pulse interval to the engine rotational mode determining unit 622 and the vibrational state estimating unit 623.

In step S11, when the IG-SW is turned on and the electronic control unit U is activated, the engine rotational mode determining unit 622 sets n=0 as an initial value to calculate an moving average value or the crank pulse interval.

In step S12, the engine rotational mode determining unit 622 checks whether the IG-SW signal designates "starter ON". In the case of "starter ON" (Yes), the process proceeds to step S13. In the case of (No), step S12 is repeated.

In step S13, the engine rotational mode determining unit 622 checks whether n is less than a predetermined value (N+1), for example, N+1(=9). When n is less than N+1(=9), the process proceeds to step S14 and calculates n=n+1 to proceeds step S15. When n is greater than N+1(=9) in step S13, the process proceeds to step S15.

In step S15, the engine rotational mode determining unit 622 reads the crank pulse interval and calculates the moving average value $T_{CRKAVE}$ (step S16). However, until n is equal to or more than N(=8), the moving average value is not calculated.

For reference's sake, as shown in FIG. 6, the moving average value $T_{CRKAVE}$ is calculated by the most left side crank pulse intervals $T_1$-$T_8$. When n is greater than or equal to N+1(=9), every time a new crank pulse interval is added, the oldest crank pulse interval is subtracted to keep the eight of the moving average value $T_{CRKAVE}$.

In step S17, the engine rotational mode determining unit 622 checks whether n is greater than or equal to N(=8). When n is greater than or equal to N, the process proceeds to step S18, or otherwise returns to step S12. That is, the process proceeds to step S18 only after the moving average value $T_{CRKAVE}$ to which eight of crank pulse intervals is input is calculated.

In step S18, the engine rotational mode determining unit 622 checks whether the moving average value $T_{CRKAVE}$ is less than or equal to a predetermined threshold value $T_{th}$. Here, the threshold value $T_{th}$ for determination is a numeric value which is set based on data obtained by way of an experiment, and is the numeric value obtained when the crank pulse interval, for example, the case wherein two, three, or four of moving average values are included, is rapidly shortened.

When the moving average value $T_{CRKAVE}$ is less than or equal to the predetermined threshold value $T_{th}$, the process proceeds to step S19, or otherwise returns to step S12 to repeat steps S12-S18.

In step S19, the engine rotational mode determining unit 622 determines the starting of the engine E and sends the flag signal of the engine active rotational mode to the vibrational state estimating unit 623 and the phase detector 624. Also, the engine rotational mode determining unit 622 sends the timing signal, at which the starting of the engine E is determined, to the phase detector 624.

Here, it is noted that the moving average value $T_{CRKAVE}$ of the crank pulse interval corresponds to "change rate of revolution change", "moving average value $T_{CRKAVE}$ is less than or equal to threshold value $T_{th}$" corresponds to "change rate of revolution change of engine is greater than or equal to predetermined value", and "determination of starting of the engine E" corresponds to "determine to detect initial explosion of engine".

In step S20, the vibrational state estimating unit 623 receives the flag signal of the engine active rotational mode from the engine rotational mode determining unit 622, reads a roll eigenvalue and magnitude of the vibration stored in the storage unit 165, sets the magnitude of a predetermined vibration at the roll eigenvalue, and sends the magnitude of a predetermined vibration at the roll eigenvalue to the actuator driving controlling unit 625.

The phase detector 624 receives the flag of the engine active rotational mode and the timing, at which the starting of the engine E is determined, from the engine rotational mode determining unit 622, and sets a phase delay Δt based on those and the TDC pulse signal and the crank pulse signal form the engine ECU 10 (step S21).

The value of this phase delay Δt is set based on the crank pulse (that is, crankshaft angle) at the timing when the starting of the engine E is determined, the setting is stored in storage unit 165 in the form of a data table, and the setting is performed with reference to the data table. In FIG. 7, the phase of the rear vibration isolating support unit Mb is delayed by the predetermined phase delay Δt, and the actuator driving current is controlled. After that, according to the roll eigenvalue, the actuator driving current of the front vibration isolating support unit Ma is controlled (in step S22, the actuator is controlled based on the roll eigenvalue). However, the apparatus and method should not be limited to the example shown above.

Depending on the timing of the starting of the engine E and the crankshaft angle, the phase of the front vibration isolating support unit Ma is delayed by the predetermined phase delay Δt. After that, according to the roll eigenvalue, the actuator driving current of the rear vibration isolating support unit Mb is controlled.

In step S23, the engine rotational mode determining unit 622 checks whether the engine revolution speed NE is greater than or equal to the predetermined value NEm. When the engine revolution speed NE is greater than or equal to the predetermined value NEm (Yes), the control of this engine active rotational mode is terminated. That is, the engine E is determined as the idling state, and a flag signal for the idling state is turned on, and is sent to the vibrational state estimating unit 623 and the phase detector 624 to control the reduction of the vibration. In step S23, when the engine revolution speed NE is less than the predetermined value NEm (No), the process returns to step S22 to control the actuator based on roll eigenvalue.

Referring to FIG. 9, the operation according to the control as described above will be explained.

FIG. 9 shows a time transient of state of an engine from engine starting to an idling state. FIG. 9A shows an ignition timing pulse (IG pulse), FIG. 9B shows a crank pulse (CRK pulse), FIG. 9C shows an engine vibration (ENG vibration), and FIG. 9D shows an engine revolution speed NE (rpm).

When the starter is made an ON state using the IG-SW (designated as "IG-ON" in FIG. 9) at 0 sec, the engine E is rotated, the engine revolution speed NE increases, and a starter driving vibration on the order of 10 Hz caused by pumping of the engine driven by the starter. Also, the engine rotational mode determining unit 622 detects the ON state of the starter by the IG-SW signal, monitors the moving average value $T_{CRKAVE}$ of the crank pulse intervals, and checks whether the moving average value $T_{CRKAVE}$ is less than or equal to the threshold value $T_{th}$. When the initial explosion occurs and the engine E starts at the time to, the moving average value $T_{CRKAVE}$ is less than or equal to the threshold value $T_{th}$ at the time of $t_1$ which is delayed slightly, the engine rotational mode determining unit 622 determines "engine starting", and sends the flag signal of the engine active rotational mode to the vibrational state estimating unit 623 and the phase detector 624. Also, the engine rotational mode determining unit 622 sends the timing signal, at which starting of the engine E is determined, to the phase detector 624.

The vibrational state estimating unit 623 receives the flag signal of engine active rotational mode to set a magnitude of a predetermined vibration at the roll eigenvalue, and sends the magnitude to the actuator driving controlling unit 625. The phase detector 624 receives the flag of the engine active rotational mode and the timing, at which the starting of the engine E is determined, from the engine rotational mode determining unit 622, and sets the phase delay Δt based on the timings and the TDC pulse signal and the crank pulse signal form the engine ECU 10. Next, according to the roll eigenvalue, actuator driving current to the front vibration isolating support unit Ma and the rear vibration isolating support unit Mb are controlled (designated as "Starting control" in FIG. 9). The frequency of this roll eigenvalue vibration is about 20 Hz, and the active control of the vibration isolating support units Ma and Mb, transmission of engine vibration to the vehicle body is reduced. In the interim, the engine E continues the composite vibration of the roll eigenvalue vibration and the increasing third component of engine vibration to increase the engine revolution speed NE, and the engine revolution speed NE comes close to the revolution speed of the idling state. The engine rotational mode determining unit 622 monitors the engine revolution speed NE to check whether the engine revolution speed NE (for example, 600 rpm) of the idling state is greater than or equal to the predetermined value NEm (for example, 450 rpm).

In FIG. 9, when the engine revolution speed NE is greater than or equal to the predetermined value NEm at the timing of $t_2$, the engine rotational mode determining unit 622 determines that the engine rotational state enters idling state, sends the flag signal of the idling state to the vibrational state estimating unit 623 and the phase detector 624, and switches the controlling of the engine vibration by the vibrational state estimating unit 623, the phase detector 624, and the actuator driving controlling unit 625 to the control of the idling state (designated as "Idling control" in FIG. 9) which is one of the vibration reducing control of regular rotational state engine. That is, the controlling is switched to the vibration reducing control for third component of engine vibration.

Since the determination of the starting of the engine E (determination of detecting the initial explosion of the engine E) is performed using the moving average value $T_{CRKAVE}$ of the crank pulse interval according to this embodiment, it is possible to determine the starting of the engine E in a time shorter than the time to determine the starting of the engine E at the timing of crank angle (120 degrees) during a top dead centre, for example, in a V engine with six-cylinders by using the moving average value $T_{CRKAVE}$ of crank pulse interval at the timing wherein two, three, or four values of crank pulse interval from the starting of the engine E are included as the threshold value $T_{th}$, and it is also possible to rapidly start controlling of the vibration isolating support unit M when roll eigenvalue vibration occurs in the engine E. If a determination of the starting of the engine E is performed at the timing of a crankshaft angle (e.g., 120 degrees) during a top dead centre, it is too late to reduce the vibration because the roll eigenvalue vibration has already occurred.

Therefore, based on the crank pulse at the time of determining starting of the engine E, the phase is shifted by $\Delta t$ to cancel the roll eigenvalue vibration, and the control of vibration isolating support units Ma and Mb is started. Thus, it is possible to reduce engine vibration at the time of engine starting.

Also, it is possible to prevent an error in the determining, and possible to surely determine the detection of the starting of the engine E (i.e., initial explosion in engine).

Further, referring to the data table stored in the storage unit 165, based on crank pulse at the timing determined as the starting of the engine E, it is determined that which should be first selected, vibration isolating support units Ma or Mb to drive the actuator thereof to extend and contract. The phase delay time $\Delta t$ for the selected vibration isolating support unit M is determined. Therefore, even if an ignition begins at any cylinder to start a self revolution, it is possible to start control of vibration isolating support units Ma and Mb suitable for the direction of the roll eigenvalue vibration.

In this embodiment, the engine E is explained as a V engine with six-cylinders, but is not limited thereto. The engine E may be a V engine with eight cylinders, a straight four engine, a horizontal opposed 4-cylinder engine, etc.

The time change rate of revolution change of the engine E (i.e., moving average value $T_{CRKAVE}$ of crank pulse interval) is used to detect the starting of the engine E, but is not limited thereto.

For example, cylinder pressure sensor may be provided in each cylinder to send signal from the cylinder pressure sensor to the engine rotational mode determining unit 622 of the electronic control unit U so as to allow the engine rotational mode determining unit 622 to determine the starting of the engine E (i.e., initial explosion) when a cylinder pressure value designated by the cylinder pressure sensor is greater than or equal to a threshold value of initial explosion by ignition.

In this case, only the method for determining the starting of the engine E (initial explosion in engine E) differs from that of the first embodiment. Other components may be the same as those of the first embodiment.

<Second Embodiment>

Next, an active vibration isolating support apparatus according to the second embodiment of the present invention will be explained.

Figure 10:
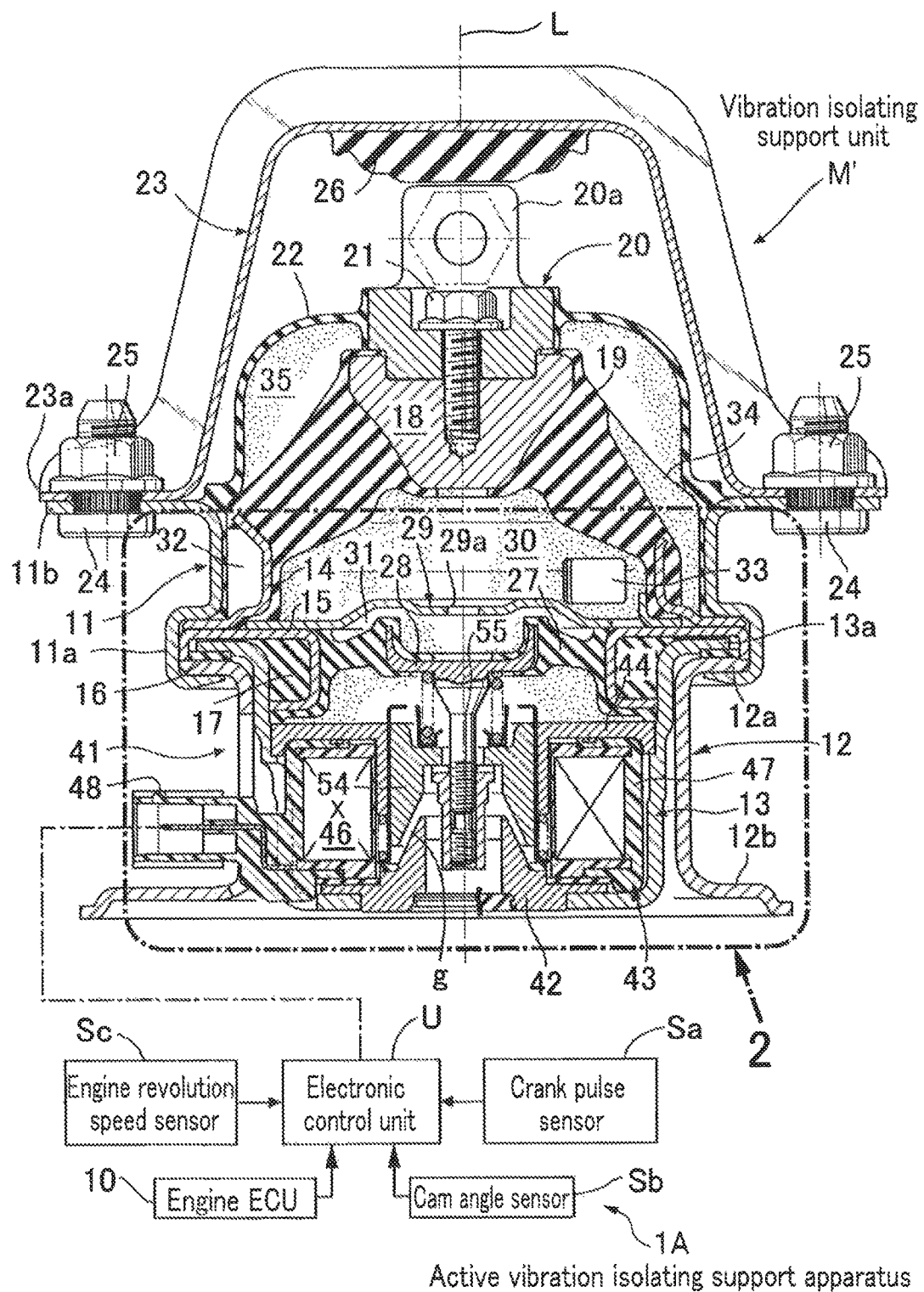
FIG. 10 is a longitudinal cross sectional view showing a structure of an active control mount of an active vibration isolating support apparatus according to a second embodiment.
Figure 11:
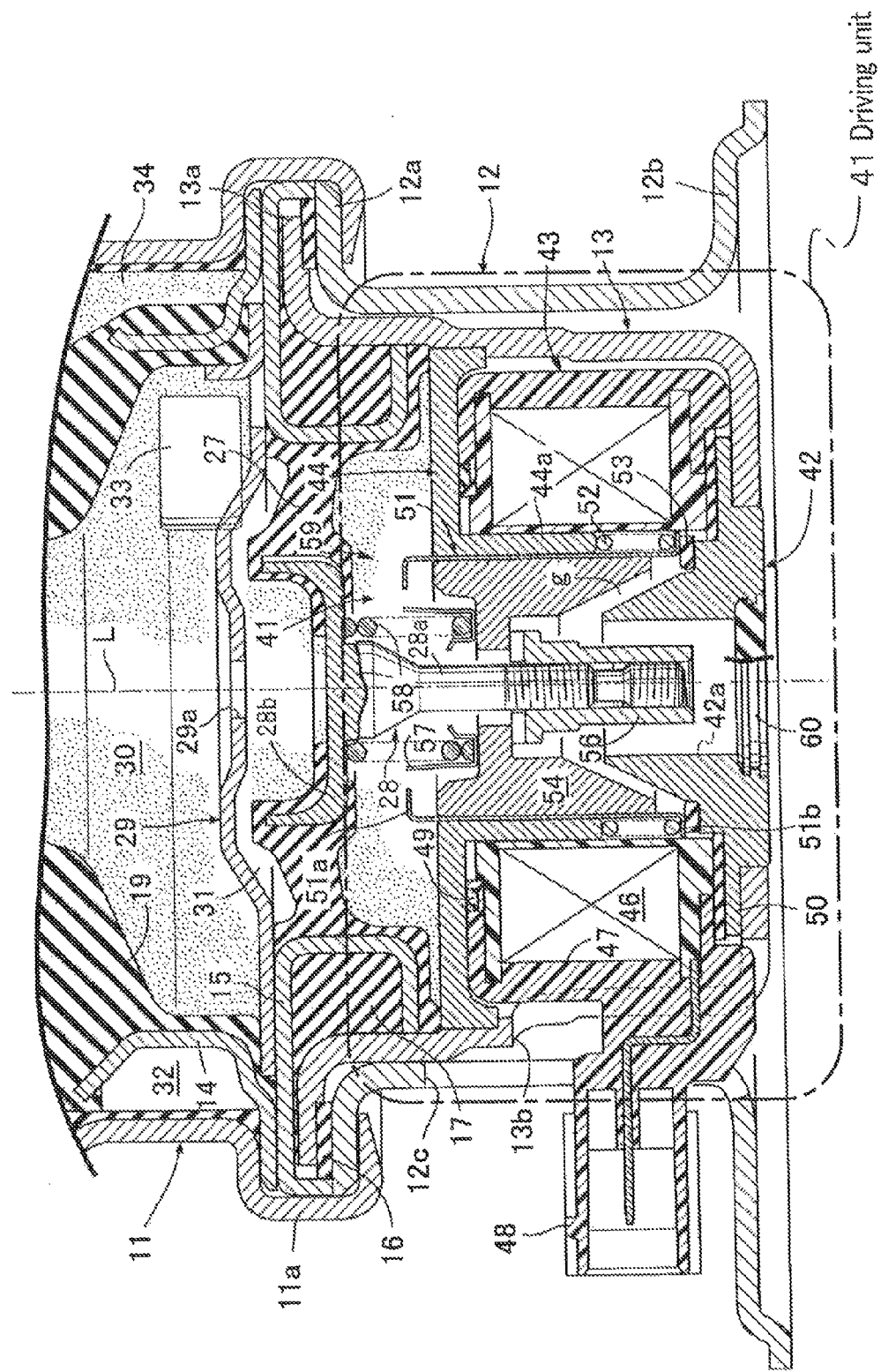
FIG. 11 is a drawing of doubled size of FIG. 10.
Figure 12:
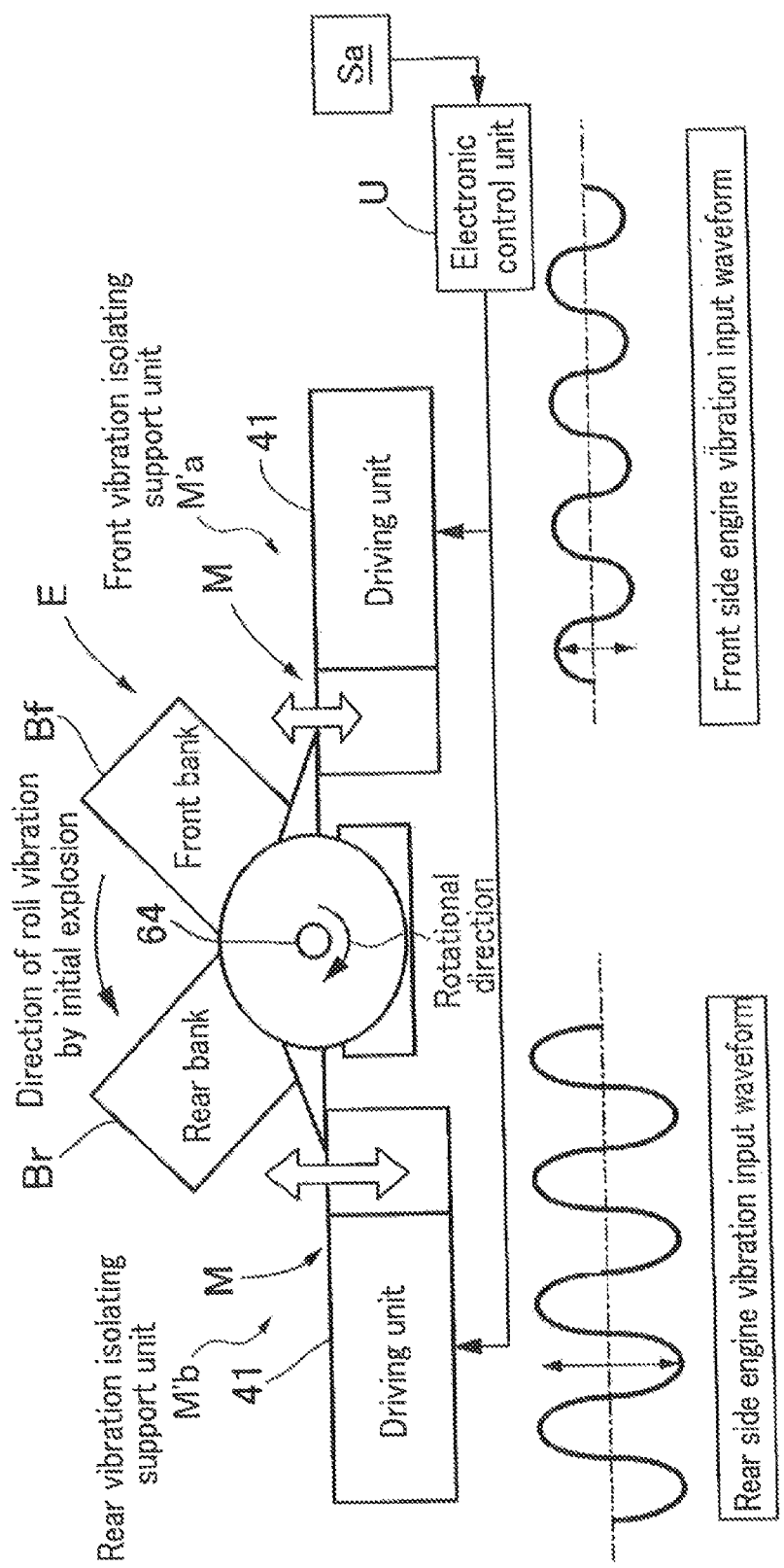
FIG. 12 is an illustration showing a support manner of an engine by a vibration isolating support unit of an active vibration isolating support apparatus.
Figure 13:
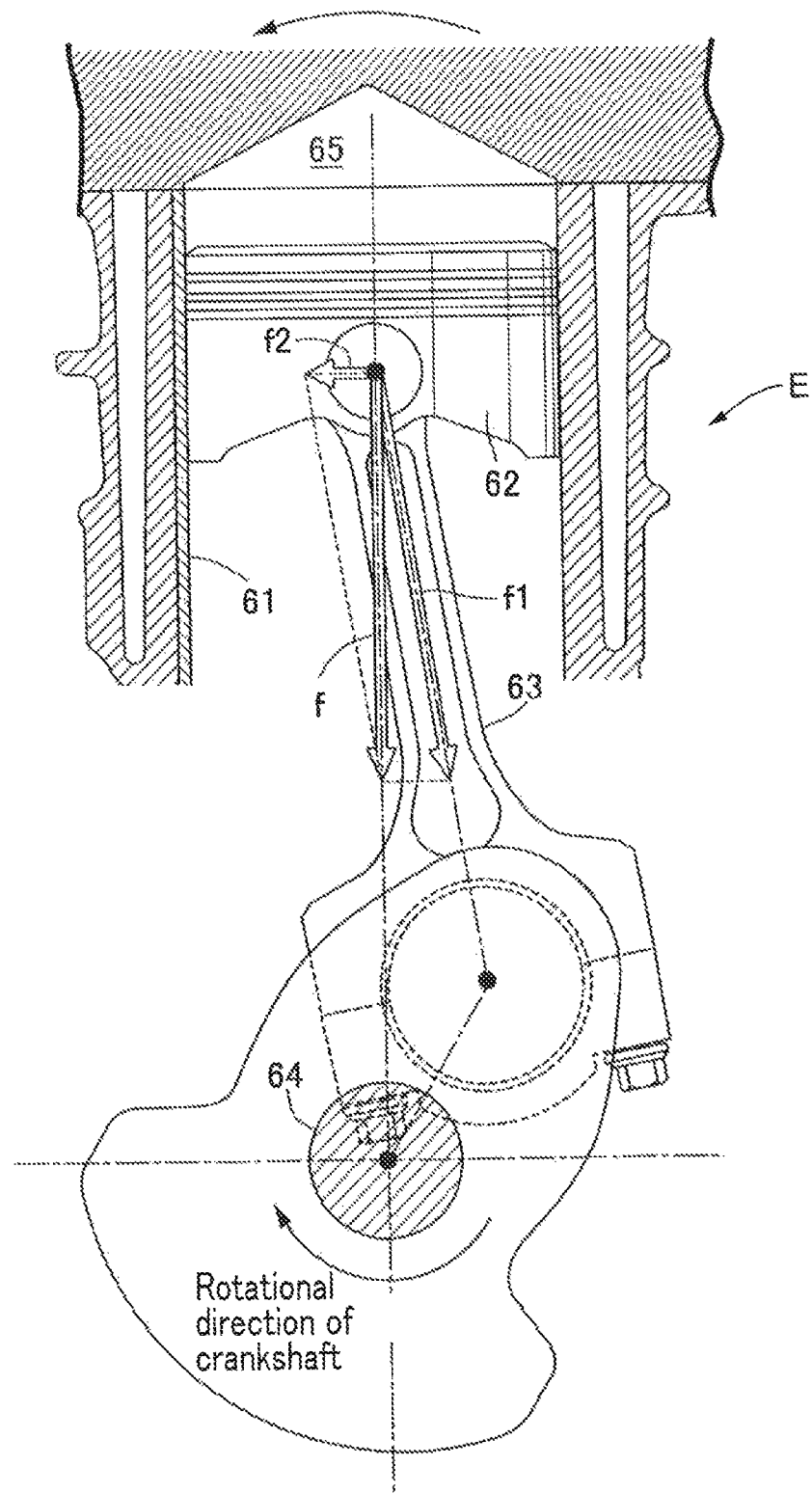
FIG. 13 is a longitudinal cross sectional view of a cylinder of an engine.
Figure 14:
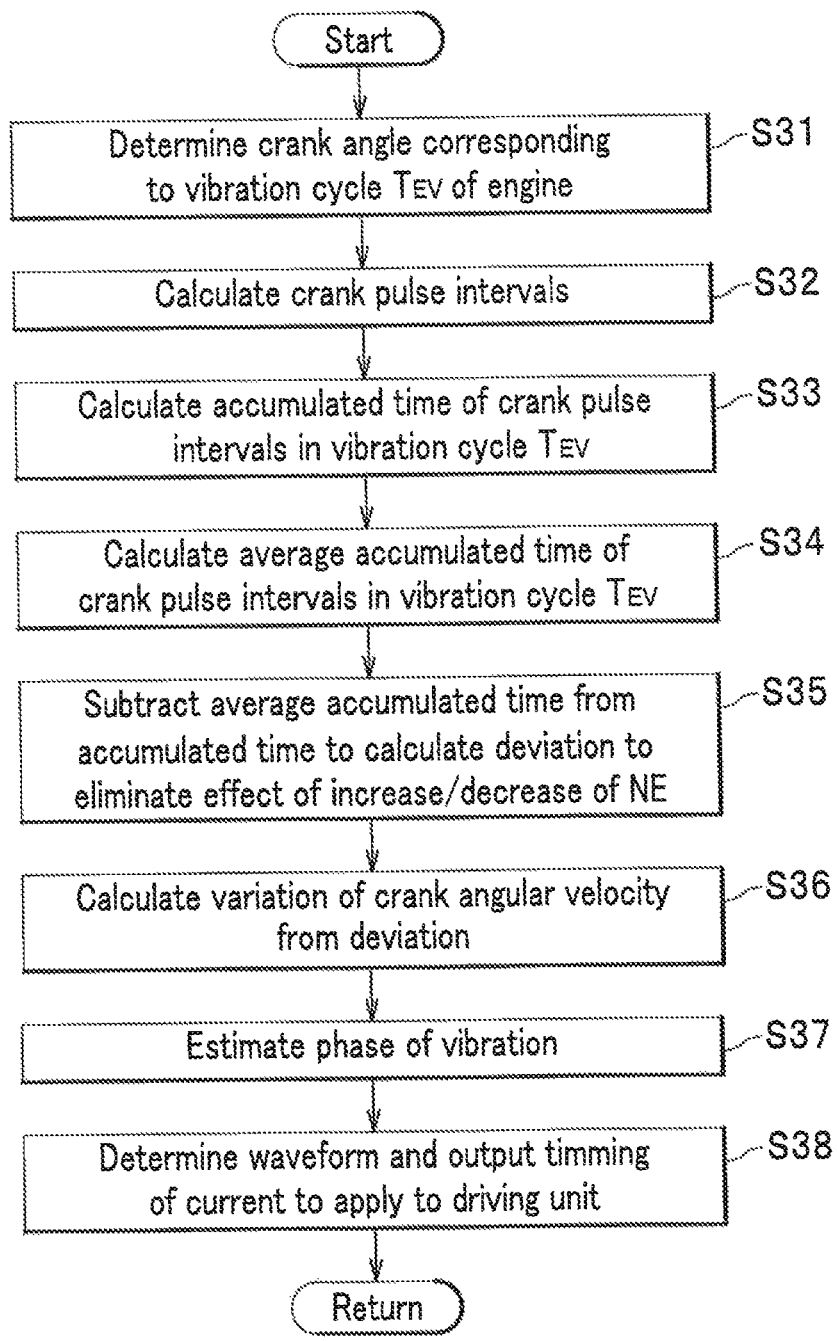
FIG. 14 is a flowchart showing a control flow of a driving unit in a normal operation.
Figure 15:
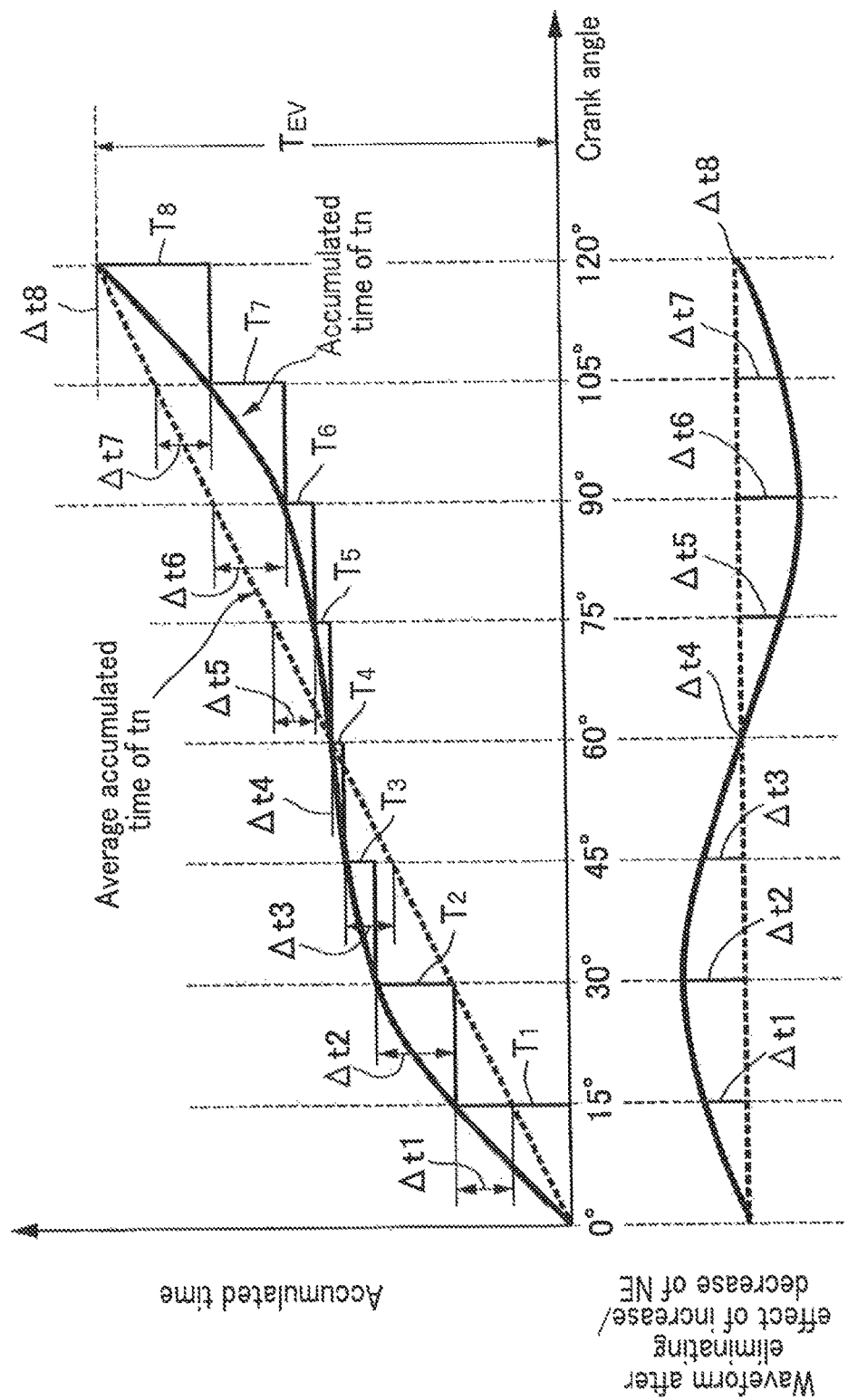
FIG. 15 is an illustration for explaining a step S35 of a flowchart in FIG. 14.

FIGS. 10-15 show the second embodiment of the present invention. FIG. 10 is a longitudinal sectional view showing the structure of an active control mount of the active vibration isolating support apparatus according to the second embodiment; FIG. 11 is a partial enlarged view of unit 2 of FIG. 10; FIG. 12 shows the supporting state of an engine by a vibration isolating support unit of the active vibration isolating support apparatus; FIG. 13 is a longitudinal sectional view of a cylinder of the engine; FIG. 14 is a flowchart representing a control flow of a driving unit during normal operation; and FIG. 15 is an explanatory diagram of step 35 in the flowchart in FIG. 14.

As shown in FIG. 10 and FIG. 11, the active control mount M' (hereinafter, referred as a "vibration isolating support unit M") of the active vibration isolating support apparatus 1A according to the second embodiment has the substantially same structure as that of the first embodiment.

The second embodiment differs from the first embodiment in the following points: (1) the fact that the flange unit 23a at the lower end of the stopper member 23 is joined to the flange unit 11b at the upper end of the upper housing 11 by bolts 24 and nuts 25 (omitted in the description of the structure of the vibration isolating support unit M according to the first embodiment) is clearly described, (2) a bolt 21 for fixing the diaphragm support boss 20 on the upper surface of the first elastic body support boss 18 is clearly described, and (3) the configuration of the driving unit 41 (see FIG. 11).

Also, in the active control mount electronic control unit U (hereinafter, referred to as "electronic unit U") according to this embodiment, as shown in FIG. 10, a crank pulse signal is input from the crank pulse sensor Sa, the TDC signals of each cylinders are input from the cam angle sensor Sb, and the engine revolution speed NE is input from an engine revolution speed sensor Sc. In the first embodiment, these signals are input via a communication line to the engine ECU 10. There is no essential difference between the two embodiments.

Hereinafter, similar numerals are used in the components similar to those of the first embodiment.

Hereinafter, a unit according to the driving unit 41 or the vibration isolating support unit M' will be explained.

An outer peripheral unit of the second elastic body 27 made of an elastic body such as a membranous rubber is joined to the inner peripheral and lower faces of the second elastic body support ring 15 by vulcanization bonding. At a radial center portion of the second elastic body 27, the movable member 28 is joined by vulcanization bonding so that the upper portion thereof (head unit 28b) is embedded in.

And, the outer peripheral unit of the second elastic body 27 is held between the second elastic body support ring 15 and a yoke 44 described below. An annular thick portion at the end of the outer peripheral unit functions as a seal. A first liquid chamber 30 defined by the partition member 29 and the first elastic body 19, and a second liquid chamber 31 defined by the partition member 29 and the second elastic body 27, communicate with each other via a through hole 29a formed in the middle of the partition member 29.

The stationary core 42, a coil assembly 43, and the yoke 44 are mounted within the actuator case 13 in sequence from the bottom to the top. The coil assembly 43 includes a cylindrical coil 46 disposed between the stationary core 42 and the yoke 44, and a coil cover 47 covering the outer periphery of the coil 46. The coil cover 47 is integrally formed with a connector 48 running through openings 13b and 12c formed in the actuator case 13 and the lower housing 12 extending outward.

A seal 49 is disposed between an upper face of the coil cover 47 and a lower face of the yoke 44. A seal 50 is disposed between a lower face of the coil 46 and an upper face of the stationary core 42. These seals 49 and 50 can prevent water or dust from entering an internal space of the driving unit 41 via the openings 13b and 12c formed in the actuator case 13 and the lower housing 12 respectively.

A thin cylindrical bearing member 51 is fitted, in a vertically slidable manner, into an inner peripheral face of a cylindrical unit 44a of the yoke 44. An upper flange 51a and a lower flange 51b are formed at the upper and lower ends of the bearing member 51 respectively, the upper flange 51a being bent radially inward, the lower flange 51b being bent radially outward. A set spring 52 is disposed in a compressed state between the lower flange 51b and the lower end of the cylindrical unit 44a of the yoke 44. The bearing member 51 is supported by the yoke 44 through the lower flange 51b pressed against the upper face of the stationary core 42 via an elastic body 53 by means of the elastic force of the set spring 52.

A substantially cylindrical movable core 54 is fitted, in a vertically slidable manner, into an inner peripheral face of the bearing member 51. A rod 28a extending downward from the center of the movable member 28 runs loosely through the center of the movable core 54, and a nut 56 is tightened around the lower end of the rod 55. A set spring 58 is disposed in a compressed state between a spring seat 57 provided on an upper face of the movable core 54 and a lower face of the head unit 28b of the movable member 28. The movable core 54 is fixed by being pressed against the nut 56 by means of the elastic force of the set spring 58. In this state, the lower face of the movable core 54 and the upper face of the stationary core 42 face each other across a conical gap g. Relative to the rod 28a, the nut 56 is tightened in an opening 42a formed in the center of the stationary core 42 with position adjustment in vertical direction. This opening 42a is closed by a rubber cup 60.

The vibration isolating support unit M' as configured above is controlled by the electronic control unit U according to vibrational state of the engine E.

The electronic control unit U of this embodiment is connected to crank pulse sensors Sa to detect crank pulses which are output 24 times per revolution of the crankshaft, that is, once every 15 degrees of the crank angle associated with rotation of the crankshaft in the engine E, and cam angle sensors Sb to detect signals which are output three times per revolution of the crankshaft, that is, every top dead centre of each of cylinders. The electronic control unit U estimates a vibrational state of the engine based on outputs from the crank pulse sensors Sa and the cam angle sensors Sb so as to control power supply to a driving unit 41 (actuator 41) of the vibration isolating support unit M'.

A coil 46 of the driving unit 41 is excited by power supply control from the electronic control unit U so as to move a movable core 54 by suction force to move a movable member 28 downwardly. Associated with movement of this movable member 28, a second elastic body 27 to define a second liquid chamber 31 is moved downwardly so as to increase the capacity of the second liquid chamber 31. Conversely, when the coil 46 is demagnetized, the second elastic body 27 is deformed upwardly by elastic deformation of itself, the movable member 28 and the movable core 54 move upwardly, and the capacity of the second liquid chamber 31 decreases.

Therefore, when low frequency engine shake vibration occurs while the vehicle V is traveling, the first elastic body 19 is deformed by a load input from the engine E, thus changing the capacity of the first liquid chamber 30, so that a liquid moves to and fro between the first liquid chamber 30 and the third liquid chamber 35 via the communication passage 32. When the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. At this time, the shape and dimensions of the communication passage 32 and the spring constant of the first elastic body 19 are set so that a low spring constant and high attenuation force are exhibited in the frequency region of the engine shake vibration. Therefore, it is possible to effectively reduce the vibration transmitted from the engine E to the vehicle body frame F.

Further, in the frequency region of the engine shake vibration, the driving unit 41 is maintained in a non-operating state.

When there is a vibration having a frequency higher than that of the above-mentioned engine shake vibration, that is, vibration during the idling or vibration during the selective-cylinder operation due to rotation of crankshaft of the engine, the liquid within the communication passage 32 providing communication between the first liquid chamber 30 and the third liquid chamber 35 becomes stationary and a vibration isolating function cannot be exhibited; the driving unit 41 is therefore driven to exhibit a vibration isolating function.

In order to exhibit a vibration isolating function by driving the driving unit 41 of the vibration isolating support unit M', the electronic control unit U controls power supply to the coil 46 based on signals from the crank pulse sensor Sa, the cam angle sensor Sb, the engine revolution speed sensor Sc, and the engine ECU 10.

As shown in FIG. 12, a V-type engine E is provided with a front bank Bf and a rear bank Br, and each of them are supported by a front vibration isolating support unit M'a and a rear vibration isolating support unit M'b respectively. Also, in order to exhibit a vibration isolating function by driving the driving units 41 of the vibration isolating support units M'a and M'b, the electronic control unit U controls power supply to the driving units 41 based on signals from the crank pulse sensor Sa.

Hereinafter, except in necessary situations, the front vibration isolating support unit M'a and the rear vibration isolating support unit M'b are only designated as a "vibration isolating support unit M."

As shown in FIG. 13, the engine E connects a piston 62 slidingly fitted into a cylinder 61 to a crankshaft 64 via a connecting rod 63. The pressure f of explosion of fuel-air mixture occurred in a combustion chamber 65 is resolved into a component f1 in a direction of the connecting rod 63 and a component f2 cylinder side pressure) in a direction orthogonal to a sidewall of the cylinder 61. In the shown embodiment, the crankshaft 64 rotates clockwise, and a roll moment (roll vibration) occurring about the crankshaft 64 by the cylinder side pressure f2 rotates counterclockwise. If the engine E is a multi-cylinder-type, and an initial explosion occurs in any one of the cylinders, the direction of roll vibration by initial explosion is always reverse to rotation direction of the crankshaft 64.

Next, control of the driving unit 41 of the vibration isolating support unit M' configured as described above will be explained. The engine E is supported by the front vibration isolating support unit M'a and the rear vibration isolating support unit M'b at a front bank Bf side and a rear bank Br side independently, and the front vibration isolating support unit M'a and the rear vibration isolating support unit M'b are controlled independently.

First, based on a flowchart in FIG. 14, a control flow during normal operation (except the starting of the engine E) will be explained.

In advance, based on information from the engine ECU 10, it is determined whether the engine E is in a selective-cylinder operation state in which selective-cylinders are in operation, or an all-cylinder operation state in which all cylinders are in operation. In this embodiment, the engine is explained as a four-stroke V engine with six-cylinders. At the time of the all-cylinder operation, since six times explosions occurs per two revolutions of the crankshaft, the crank angle for that vibration cycle is 120 degrees. In this vibration cycle, eight crank pulses are output every 15 degrees of the crank angle. Also, when the cylinders which are on one side bank are made to be non-operational, three times explosion occurs per two revolutions of the crankshaft, and the crank angle for that vibration cycle is 240 degrees. In this vibration cycle, sixteen of crank pulses are output.

For example, if the engine E is determined that it is in the all-cylinder operation state, the crank angle for a vibration cycle $T_{EV}$ (in this case, 120 degrees) is determined first in step S31. In next step S32, eight crank pulses in the vibration cycle $T_{EV}$ are read so as to calculate a crank pulse interval. As shown in FIG. 15, eight crank pulses are output in the vibration cycle $T_{EV}$, and crank pulse interval $T_n$, ($T_1$, $T_2$, $T_3$, ..., $T_8$) of those varies depending on vibration in the angular velocity of the crankshaft.

That is, a crank angular velocity $\omega$ increases and the crank pulse interval $T_n$, decreases in explosion stroke of the engine, and the crank angular velocity $\omega$ decreases and the crank pulse interval $T_n$, increases in compression stroke of the engine. Otherwise, in the stroke in which the engine revolution speed NE increases, the crank angular velocity $\omega$ increases and the crank pulse interval $T_n$, decreases. In the stroke in which the engine revolution speed NE decreases, the crank angular velocity $\omega$ decreases and the crank pulse interval $T_n$, increases. Therefore, the crank pulse interval $T_n$, shown in FIG. 15 includes one factor caused by variation in crank angular velocity $\omega$ associated with the vibration in each vibration cycle $T_{EV}$ of the engine E, and other factor caused by variation in the crank angular velocity $\omega$ associated with increase/decrease in the engine revolution speed NE.

Out of the two factors, a factor which has effect on controlling of the vibration isolating support unit M' in the above two factors is the former factor (variation in the crank angular velocity $\omega$ associated with the vibration), and the latter factor which has no effect on controlling of the vibration isolating support unit M' (variation in crank angular velocity co associated with increase/decrease in engine revolution speed NE) should be excluded.

In next step S33, an accumulated time $\Sigma T_n = T_1 + T_2 + T_3 + ... + T_8$ of eight of crank pulse intervals $T_n$ of crank pulse is calculated. This accumulated time $\Sigma T_n$ corresponds to the vibration cycle $T_{EV}$.

In next step S34, an average accumulated time of the eight crank pulse intervals $T_n$ is calculated. As will be apparent from FIG. 15, although the line of the accumulated time curves in S-shape, the line of the average accumulated time is a straight-line connecting a starting point and an ending point of the line of the accumulated time. That is, the average accumulated time corresponds to the accumulated time when the crank angular velocity $\omega$ is constant, and the value thereof increases by $T_{EV}/8$ for every 15 degrees of crank angle.

In next step S35, eight of deviations $\Delta t_1$, $\Delta t_2$, $\Delta t_3$, ..., $\Delta t_8$ are calculated by subtracting the average accumulated time from the accumulated time for every 15 degrees of the crank angle. The line curving in S-shape on the downside in FIG. 15 represents deviations $\Delta t_n$, and this line corresponds to a variation waveform of the crank pulse interval $T_n$ after eliminating effect of variation in the engine revolution speed NE, that is, corresponds to a deviation for the crank pulse interval $T_n$, when crank angular velocity $\omega$ is constant.

Provided that there is no engine vibration, if the engine revolution speed NE is constant, the accumulated time of the crank pulse interval $T_n$, increases linearly like the average accumulated time, if the engine revolution speed NE increases/decreases, the accumulated time of the crank pulse interval $T_n$, deviates from the liner average accumulated time. However, in this embodiment, in practice, a liner average accumulated time obtained by averaging the varying engine revolution speed NE is used as a reference, a deviation $\Delta t_n$ from the average accumulated time is calculated, and deviation $\Delta t_n$ caused by only engine vibration (i.e., effect of variation in engine revolution speed NE is excluded) can be obtained. This means that deviation of a real angular velocity for an average angular velocity of the crankshaft is obtained.

In next step S36, a maximum value and minimum value of the deviation $\Delta t_n$ are determined, and based on the deviation of the maximum value and the minimum value, a variation in the crank angular velocity VAPP is calculated. In step S37, based on an output timing of the cam angle sensor Sb and time n to the minimum value, a phase of the vibration is estimated. Next, in step S38, based on a map of the variation VAPP prestored in the electronic control unit U and the engine revolution speed NE, the magnitude of the vibration is calculated so as to determine the current waveform applied to the driving unit 41, and based on the map of the phase and the engine revolution speed NE, an output timing of the current waveform applied to the driving unit 41 is determined.

Further, when it is determined that the engine E is in the selective-cylinder operation state, sixteen crank pulses in the vibration cycle $T_{EV}$ are read so as to determine the current waveform applied to the driving unit 41 and the output timing in the same way as that of the all-cylinder operation state.

As described above, when the engine E vibrates, it is possible to exhibit a vibration isolating function to reduce transmission of the vibration of the engine E to the vehicle body frame by making the vibration isolating support unit M' to extend and contract so as to follow the vertical motion of the engine E depending on the magnitude and phase of the vibration.

As described above, when the engine E vibrates, it is possible to exhibit a vibration isolating function to reduce transmission of vibration of the engine E to the vehicle body frame by driving the vibration isolating support unit M' to extend and contract so as to follow the vertical motion of the engine E depending on the magnitude and phase of the vibration.

Although it is possible to reduce the vibration of the engine E in the above described way during the normal operation of the engine E, since roll vibration of the engine E caused by an initial explosion at the time of the starting of the engine E is unsteady and transitory, it is impossible to reduce this roll vibration caused by the initial explosion in the above described way.

As shown in FIG. 13, since the direction of roll vibration of the engine E caused by initial explosion is always opposite to the rotation direction of the crankshaft 64, the front vibration isolating support unit M'a is compressed and the rear vibration isolating support unit M'b is extended by the roll vibration. Since the front vibration isolating support unit M'a and the rear vibration isolating support unit M'b have a structure to contract by supplying power to the driving units 41, it is possible to reduce transmission of the roll vibration to the vehicle body frame by supplying power to the driving unit 41 of the front vibration isolating support unit M'a at the timing of initial explosion of the engine E to drive the vibration isolating support unit M' to contract.

The initial explosion of the engine E is determined as follows. Although the crank angular velocity is kept relatively a small value during a cranking of the engine E, the crank angular velocity increases rapidly associated with an initial explosion in the engine E. It is possible to determine the detection of the initial explosion in the engine E by detecting this rapid increase in the crank angular velocity from a crank pulse interval output from the crank pulse sensor Sa (i.e., by detecting that the increasing rate in the angular velocity of the crankshaft 64 is greater than or equal to a predetermined value). The current waveform applied to the driving unit 41 of the vibration isolating support unit M' at this moment is prestored in the electronic control unit U as a current waveform to cancel an experimentally obtained waveform of the roll vibration caused by the initial explosion.

As described above, since the electronic control unit U controls the vibration isolating support unit M' so as to reduce roll vibration of the engine E in a direction which is reverse to the rotation direction of the crankshaft of the engine when it is determined that the initial explosion is detected at the time of starting of the engine E, it is possible to reduce the transitory roll vibration occurring at the time of the starting of the engine E by the vibration isolating support unit M'.

Also, since the existing crank pulse sensor Sa is used to detect initial explosion in the engine E, initial explosion is detected accurately without any special sensor.

While the second embodiment has been described above, various changes and modifications can be made without departing from the spirit and scope of the invention.

For example, the vibration isolating support unit M' is not limited to the unit filled with a liquid. The vibration isolating support unit M' may use a piezoelectric element.

Although the vibration isolating support unit M' and M are disposed on opposite sides of the crankshaft 64 in the second embodiment, the vibration isolating support unit M' may be disposed on one side.

Although the vibration isolating support unit M' is contracted by current supply, the vibration isolating support unit M' may be extended by current supply. In this case, the roll vibration is reduced by supplying current to the vibration isolating support unit M' to which extension force is applied by an initial explosion in the engine E.

<Third Embodiment>

Next, a third embodiment according to the present invention will be explained.

A feature of the active vibration isolating support apparatus 1 of the present embodiment is basically identical to that of the first embodiment. An arrangement of the vibration isolating support unit M of the active vibration isolating support apparatus 1 according to the present embodiment is identical to those shown in FIG. 1A and FIG. 1B. The feature of the active vibration isolating support apparatus 1 includes an active control mount electronic control unit UB (hereinafter, referred to as electronic control unit UB as shown in FIG. 2 and FIG. 3) which controls the vibration isolating support unit M shown in FIG. 2. In addition, hardware of the electronic control unit UB and connections of the electronic control unit UB with the engine ECU are identical to those of the first embodiment as shown in FIG. 3.

For reference's sake, the electronic control unit UB includes a storage unit 165 such as a flash memory for storing a data 165a (see FIG. 18) required for controlling the vibration isolating support unit M.

It is noted that the electronic control unit UB corresponds to a "controller".

The present embodiment is identical to the first embodiment except a control method for the engine vibration after determining a detection of an initial explosion at a starting of the engine E, in accordance with replacement of the electronic control unit U of the first embodiment with the electronic control unit UB.

A component identical to that of the first embodiment is labeled the same number, and the explanation will be omitted.

Next, a reduction of a vibration to be generated at a starting of the engine E, which is the specific feature of the present invention, will be explained.

In the conventional active vibration isolating support apparatus, the purpose is focused on absorbing an engine vibration which is generated when the engine E steadily rotates, for example, during the idling of the engine E or when 6-cylinders operation is changed to 3-cylinders operation.

In the active vibration isolating support apparatus 1 (see FIG. 1A) according to the present embodiment, the vibration isolating support unit M (see FIG. 1A) supports the engine E (see FIG. 1A), and reduces a roll vibration to be generated, especially, at a starting of the engine E by driving the driving unit 41 of the vibration isolating support unit M.

It is found that if the engine E (see FIG. 1A) is started by a starter, in a period between a time just after the starting of the engine E (hereinafter, beginning of self-revolution by explosion in a cylinder triggered by ignition referred as to "starting") and a time when a revolution speed of the engine E reaches the revolution speed in an idling state, a vibration of the engine E is mainly composed of a natural vibration frequency (roll eigenvalue) which is determined by a weight of the engine E (here, the weight includes weights of engine E and transmission MT shown in FIG. 1B) and a spring constant of the vibration isolating support unit M (see FIG. 1B).

It is also found that, if the engine E is a V engine with six-cylinders, since there are three explosions in the cylinders for one revolution of the crankshaft, a vibration corresponding to the engine revolution speed NE is called "third component of engine vibration"; A vibration frequency as well as a magnitude of the third component of engine vibration increases as the engine revolution speed NE increases; In contrast, a roll vibration by the natural vibration frequency decreases, and when the engine revolution speed NE approaches the revolution speed NE in the idling state, the third component of engine vibration becomes dominant.

It is noted that the roll vibration is a vibration to be generated in a rotational direction of the crankshaft. Therefore, if the engine E is a sideways-mounted engine, the roll vibration is generated in a front-rear direction of the vehicle.

In addition, the roll vibration is generated when the crankshaft rotates unsteadily, for example, at a starting of the engine.

For reference's sake, if the engine is a straight four engine, since there are 2 (two) explosions in the cylinders for one revolution of the crankshaft, a vibration corresponding to the engine revolution speed NE is called a second component of engine vibration. If a V engine with six-cylinders is operated with three-cylinders, that is, under a selected cylinder operation, since there are 1.5 (one and a half) explosions for one revolution of the crankshaft, a vibration corresponding to the engine revolution speed NE is called $1.5_{th}$ (one and a half) component of engine vibration.

FIG. 4 is an analysis result showing time dependences of engine vibration characteristics at a starting of an engine. In FIG. 4, the horizontal axis indicates a time (sec) and the vertical axis indicates a vibration frequency (Hz). Magnitudes of the frequencies are shown with areas having different hatching patterns.

As shown with a dotted line, a vibration component of the third component of engine vibration (indicated by "Third component of engine vibration" in FIG. 4) has a composite vibration region of the natural vibration frequency (roll eigenvalue) and the third component of engine vibration between a time to just after the starting of the engine E and a time $t_2$ when the engine revolution speed NE reaches a predetermined engine revolution speed NEm which is a little lower than the engine revolution speed NE in the idling state. It can be seen from FIG. 4 that after the time $t_2$, the third component of engine vibration becomes dominant.

The present embodiment is characterized in that the electronic control unit UB estimates a magnitude and vibration period of the roll vibration (vibration period correspond to $t_0$ to $t_2$ in FIG. 4) based on a magnitude of an engine revolution change at a starting of the engine, that is, based on an increase rate of the engine revolution speed NE.

It is noted that hereinafter, the magnitude and vibration period of the roll vibration may be described as a vibration state of roll vibration.

Figure 16:
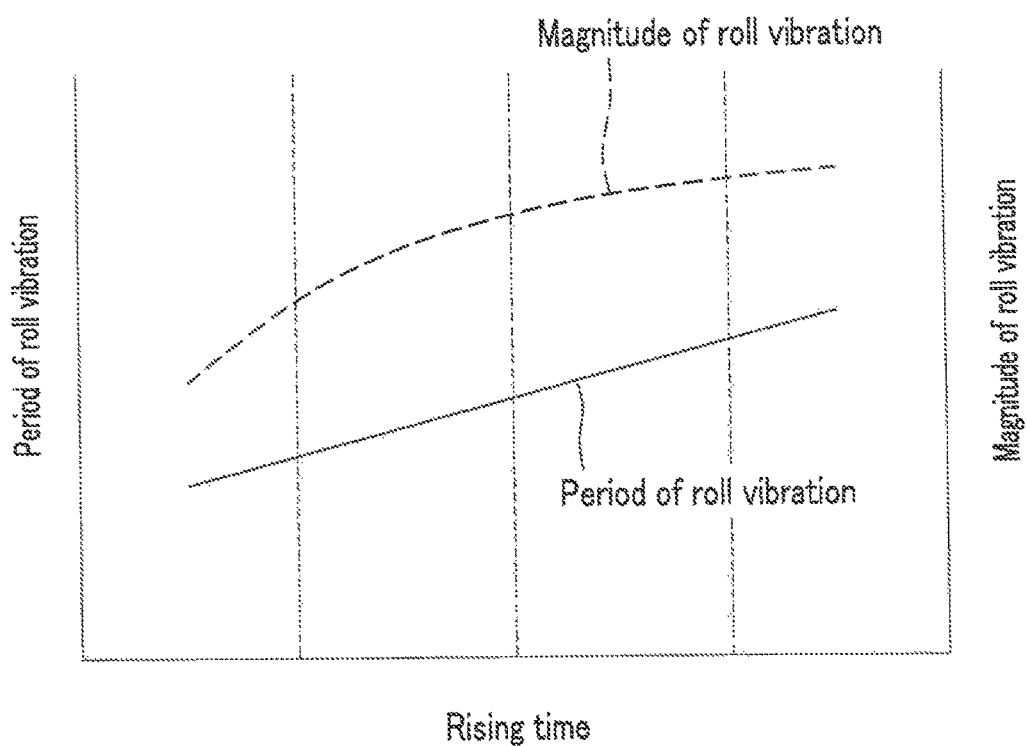
FIG. 16 is a graph showing a relationship between an increase rate of an engine revolution speed and a vibration state of roll vibration at a starting of an engine.

FIG. 16 is a graph showing a relationship between an increase rate of an engine revolution speed at a starting of an engine and a vibration state of roll vibration. In FIG. 16, the increase rate of the engine revolution speed NE is measured as a rising time of the engine revolution speed NE at the starting of the engine E, and a magnitude (dotted line in FIG. 16) and period (solid line in FIG. 16) of the roll vibration are shown against a time (rising time) corresponding to between a low revolution speed NE of the engine E (see FIG. 1B) and a predetermined high revolution speed NE. In the horizontal axis, the rising time becomes longer as the position moves to the right, that is, the engine revolution speed NE increases slowly.

As shown in FIG. 16, as the rising time of the engine revolution speed NE becomes shorter, that is, as the engine revolution speed NE increases faster, a magnitude of the roll vibration to be generated becomes smaller and the period of roll vibration becomes shorter. This means that as the increase rate of the engine revolution speed NE becomes larger, the magnitude of the roll vibration becomes smaller and the period of roll vibration becomes shorter. Therefore, a relationship between the increase rate of the engine revolution speed NE and the vibration state of roll vibration to be generated may be measured for mapping, and the data may be stored in the storage unit 165 of the electronic control unit UB shown in FIG. 3 as the data 165a with, for example, a table data format.

Since the map prepared as described above is stored in the storage unit 165 (see FIG. 3) of the electronic control unit UB (see FIG. 3), the electronic control unit UB can estimates a vibration state of roll vibration at a starting of the engine E (see FIG. 1B) corresponding to an increase rate of the engine revolution speed NE, by referring to the map.

Instead of the method described above, a calculating formula for calculating a vibration state of roll vibration based on an increase rate of the engine revolution speed NE may be prepared.

With the preparation of the calculating formula described above, the electronic control unit UB (see FIG. 3) can calculate (estimate) a vibration state of roll vibration at a starting of the engine E (see FIG. 1B), which is based on an increase rate of the engine revolution speed NE, by the calculating formula.

Figure 17:
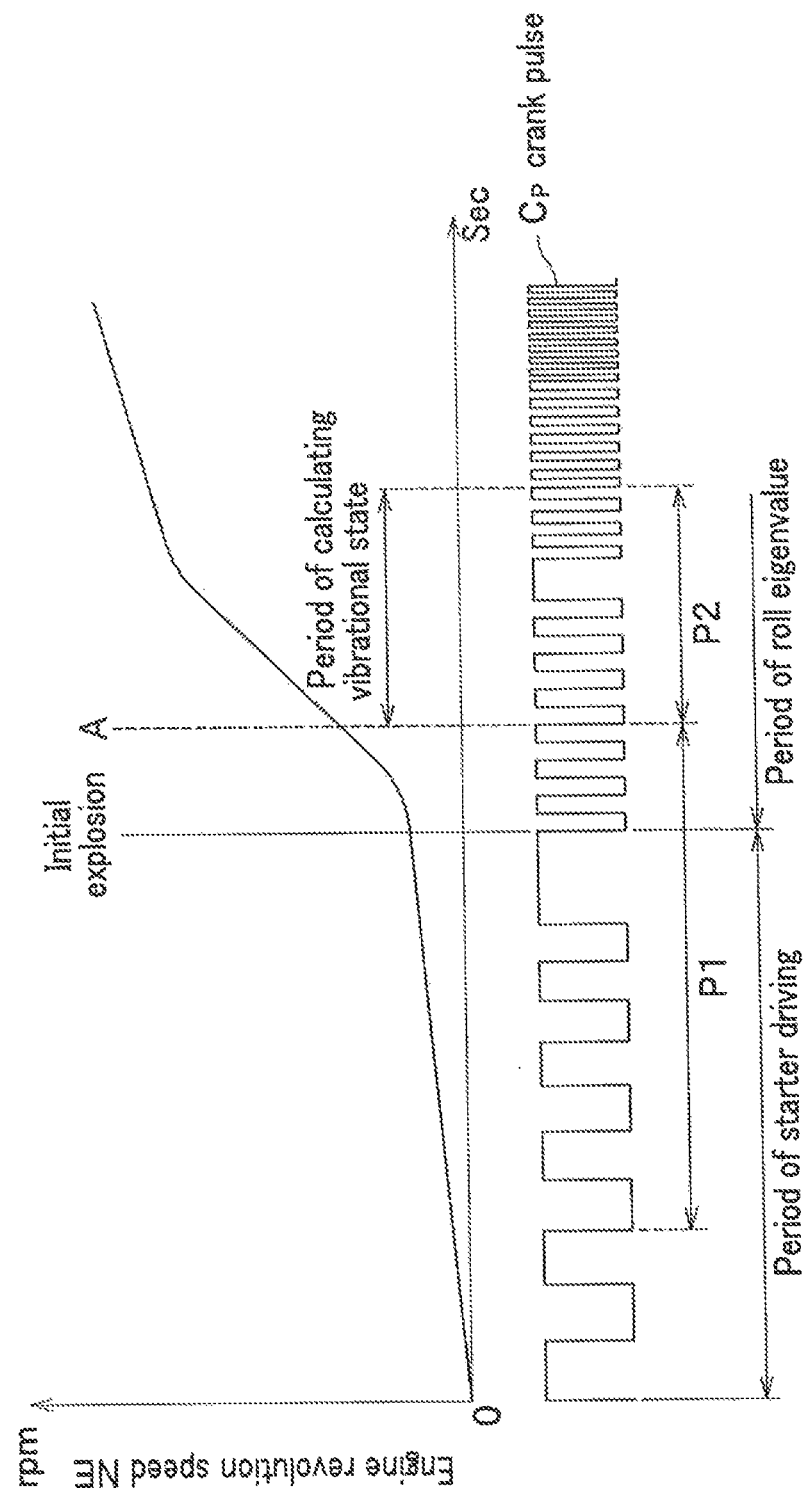
FIG. 17 is an illustration showing an engine revolution speed and crank pulses at a starting of an engine.

FIG. 17 is an illustration showing states of an engine revolution speed and a crank pulse at a starting of an engine. In the present embodiment, as shown in FIG. 6 of the first embodiment, the crank pulse (see FIG. 6, indicated as CRK pulse) signal is output every 15 degrees of crankshaft rotational angle. However, the crank pulse is not output at a top dead center (TDC) of a representative cylinder, that is, no crank pulse at the top dead center. Here, a crank pulse interval ($T_1$, $T_2$, $T_3$, $T_4$, $T_5$, $T_6$, $T_7$, and $T_8$ in FIG. 6) is, as shown in FIG. 6, a one cycle of a square wave. Since there is no crank pulse at the top dead center, while there is a TDC pulse signal at the top dead center of the representative cylinder, a half value of a crank pulse interval ($T_4+T_5$) for 30 degrees of the crankshaft rotational angle is calculated as the crank pulse interval.

Therefore, although the description later is expressed as eight pulse intervals, this is because no pulse portion is counted as two pulses.

As shown in FIG. 17, when the engine E (see FIG. 1B) is started, the crankshaft of the engine E is rotated by a starter (for example, self starter motor), and the engine revolution speed NE increases slowly (period of starter driving). Then, a first ignition (hereinafter, may be referred to as initial explosion) is generated when the engine revolution speed NE reaches a predetermined engine revolution speed NE, and the engine E is started. A roll vibration is generated during a period (period of roll eigenvalue) between the starting of the engine E by the initial explosion and a time when the engine revolution speed NE becomes steady.

In the present embodiment, the electronic control unit UB (see FIG. 2) measures an increase rate of the engine revolution speed NE of the engine E (see FIG. 1B) starting from a time indicated by A in FIG. 17 at which the electronic control unit UB (see FIG. 3) determined that an initial explosion was detected, that is, during the period for calculating vibration state, and estimates a vibration state of roll vibration based on the measured increase rate of the engine revolution speed NE. Then, the electronic control unit UB controls the driving unit 41 of the vibration isolating support unit M based on the estimated vibration state of roll vibration to reduce the roll vibration.

In the present embodiment, the electronic control unit UB (see FIG. 3) is configured so that the electronic control unit UB determines a detection of initial explosion by a revolution change.

As shown in FIG. 17, a crank pulse Cp has a long cycle in the period of starter driving since the engine revolution speed NE is small. However, as the engine revolution speed NE increases after starting of the engine E by the initial explosion, the cycle becomes shorter. Therefore, if an average value of one cycle of the crank pulse becomes small, the electronic control unit UB (see FIG. 3) can determine that the engine revolution speed NE increased. As shown in FIG. 17, since the engine revolution speed NE rapidly increases after initial explosion, the electronic control unit UB can determine that the initial explosion was detected by determining an increase in the engine revolution speed NE. For example, using a method of such as steps S11 to S19 shown in the flowchart of FIG. 8 in the first embodiment, the electronic control unit UB can determine the starting of the engine E, that is, the detection of the initial explosion.

Therefore, in the present embodiment, a crank pulse to be detected by the crank pulse sensor Sa (see FIG. 3) is input in the electronic control unit UB, and the electronic control unit UB measures a time interval (hereinafter, referred to as crank pulse interval) of the eight input crank pulses. Then, the electronic control unit UB calculates an average value per one crank pulse cycle by dividing the crank pulse interval of the eight crank pulses by eight. When the average value per one crank pulse cycle calculated as described above becomes smaller than a threshold value set in advance, the electronic control unit UB determines a detection of an initial explosion in the engine.

It is noted that a magnitude of average value per one cycle of the eight crank pulses corresponds to a "magnitude of revolution change".

It is also noted that in the present embodiment, the average value per one cycle was calculated using eight crank pulses. However, a crank pulse number is not limited to the eight crank pulses for calculating the average value.

As shown in FIG. 17, a cycle of the crank pulse Cp becomes shorter as the engine revolution speed NE increases. Therefore, when a calculated average value of the crank pulse Cp per one cycle becomes smaller than a threshold value set in advance, the electronic control unit UB (see FIG. 3) determines a detection of an initial explosion in the engine. In FIG. 17, if an average value of the eight crank pulses Cp in the time interval shown by P1 becomes not more than a threshold value, the electronic unit UB determines a detection of an initial explosion at A point in the engine.

In addition, in the present embodiment, the electronic control unit UB (see FIG. 2) measures an increase rate of the engine revolution speed NE of the engine E (see FIG. 1B) starting from a time indicated by A in FIG. 17 at which the electronic control unit UB determined that the initial explosion was detected, that is, during the time shown in FIG. 17 as a period of calculating vibrational state, and estimates a vibration state of roll vibration based on the measured increase rate of the engine revolution speed NE. Further, based on the estimated vibration state of roll vibration, the electronic control unit UB controls the vibration isolating support unit M to reduce the roll vibration.

As shown in FIG. 17, the electronic control unit UB (see FIG. 2) temporarily stores an interval of eight crank pulses just before A point at which the electronic control unit UB determined that the initial explosion was detected in, for example, RAM 164 (see FIG. 3) as P1 (sec). In addition, the electronic control unit UB defines an interval of eight crank pulses just after A point as P2 (sec). As described above, in a V engine with six-cylinders, the crank pulse Cp is generated every 15 degrees of crank angle, eight crank pulses Cp corresponds to 120 degrees. That is, the interval of eight crank pulses corresponds to a time required for ⅓ revolution of a crankshaft.

Then, the electronic control unit UB (see FIG. 3) calculates an engine revolution speed NE1 (rpm) just before determining a detection of initial explosion, that is, just before A point in FIG. 17, by the next formula (1). Hereinafter, the engine revolution speed NE1 just before A point is called as "engine revolution speed NE1 just before initial explosion".

$$NE1=(\tfrac{1}{3})/(P1/60) \tag{1}$$

In addition, the electronic control unit UB calculates an engine revolution speed NE2 (rpm) just after determining the detection of initial explosion, that is, just after A point in FIG. 17, by the next formula (2). Hereinafter, the engine revolution speed NE2 just after A point is called as "engine revolution speed NE1 just after initial explosion".

$$NE2=(\tfrac{1}{3})/(P2/60) \tag{2}$$

As described above, the electronic control unit UB calculates the engine revolution speed NE1 just before initial explosion and the engine revolution speed NE1 just after initial explosion. Then, the electronic control unit UB calculates NE2-NE1 as an increase of engine revolution speed just after the initial explosion.

In addition, a time required to increase from the engine revolution speed NE1 (rpm) to the engine revolution speed NE2 (rpm) just after the initial explosion is expressed by P2/60 (min).

Therefore, an increase rate NEr of engine revolution speed per unit time just after the initial explosion is calculated by the next formula (3).

$$NEr=(NE2-NE1)/(P2/60) \tag{3}$$

As described above, since there is a given relationship between the increase rate NEr of engine revolution speed and the vibration state of roll vibration, the relationship between the increase rate NEr of engine revolution speed and the vibration state of roll vibration can be measured in advance for mapping. The mapped data may be stored in the storage unit 165 (see FIG. 3) of the electronic control unit UB as the data 165a (see FIG. 3) with, for example, a table data format. Through the method described above, the electronic control unit UB can estimate a vibration state of roll vibration corresponding to the calculated increase rate NEr of engine revolution speed by referring to the map stored in the storage unit 165.

It is noted that to calculate the time interval by measuring the crank pulse Cp just after the initial explosion corresponds to "measuring a time between an initial explosion and a time when an engine revolution speed reaches a predetermined revolution speed". As described above, in a V engine with six-cylinders, the crank pulse Cp is generated every 1/24 revolution of the crankshaft. Therefore, to measure an interval including the same number of pulses (eight pulses in the present embodiment) is to measure a time required for rotating the crankshaft a given number of revolution (⅓ revolution in the present embodiment). Then, a time required to reach a predetermined revolution speed of the crankshaft can be estimated from a change of a time required for rotating the crankshaft a given number of revolution at before and after the initial explosion. Accordingly, to calculate a time interval by measuring the crank pulse Cp just after the initial explosion is to measure a time between the initial explosion and a time when the engine revolution speed reaches a predetermined revolution speed.

Of course, it may be allowed to measure the revolution speeds NE of the engine E (see FIG. 1B) before and after the initial explosion, and to measure a time that the revolution speed NE of the engine E reaches a predetermined revolution speed. However, in this case, measurement of the revolution speed NE of the engine E is required twice, and a time for rotating the crankshaft at least two revolutions is also required.

In contrast, in the case when eight crank pulses Cp are measured like the present embodiment, the time between the initial explosion and the time that the engine revolution speed NE reaches a predetermined revolution speed can be measured with ⅓ revolution of the crankshaft as described above, and even when eight crank pulses Cp are measured before and after the initial explosion, the time can be measured with a time required for ⅔ revolution of the crankshaft. Accordingly, the method described above has an excellent advantage that a time between an initial explosion and a time that the engine revolution speed NE reaches a predetermined revolution speed can be measured with a shorter time compared with a method for measuring a revolution speed of the engine E.

If a vibration state of roll vibration is estimated as described above, the electronic control unit UB (see FIG. 3) transmits a control signal to be calculated based on a magnitude of the estimated roll vibration to the front vibration isolating support unit Ma (see FIG. 3) and the rear vibration isolating support unit Mb (see FIG. 3), and controls the driving units 41 (see FIG. 2) of the front vibration isolating support unit Ma and the rear vibration isolating support unit Mb to reduce the roll vibration. Accordingly, the electronic control unit UB controls the vibration isolating support unit M as described above during the estimated period of the roll vibration to reduce the roll vibration to be generated at a starting of the engine E (see FIG. 3).

Figure 18:
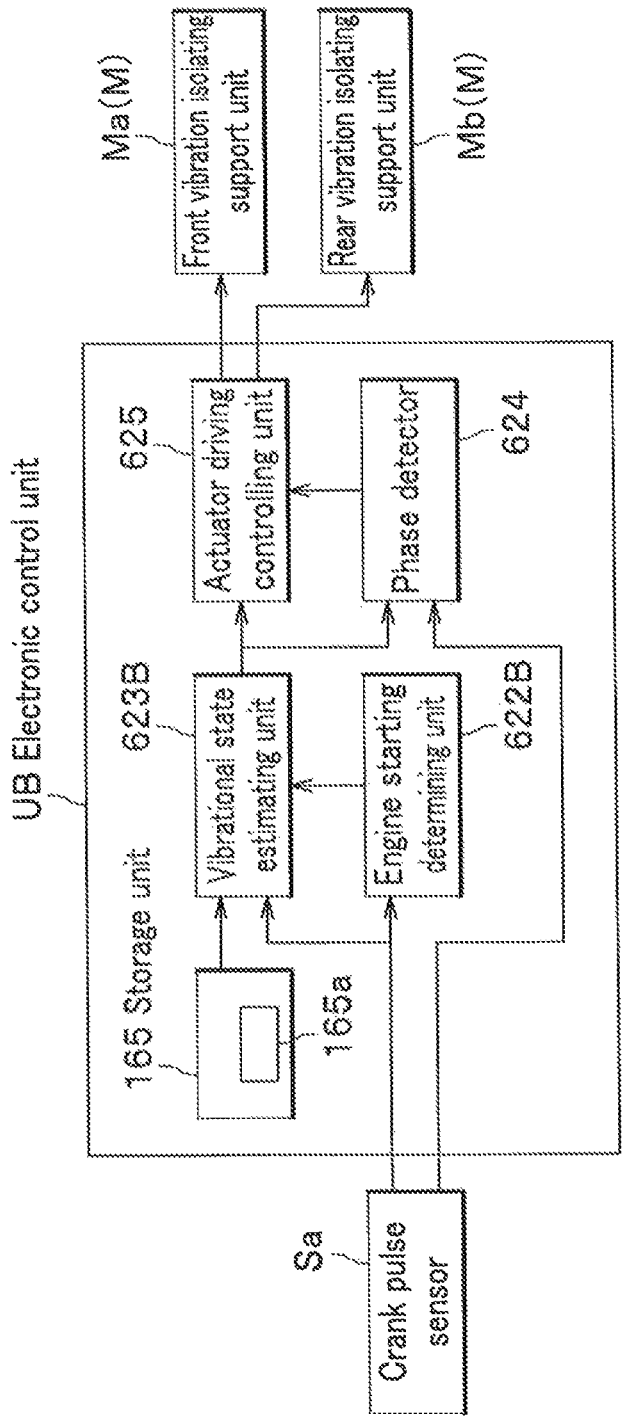
FIG. 18 is a functional block diagram of ACMECU.

FIG. 18 is a functional block diagram of an electronic control unit. As described above, the electronic control unit UB estimates a vibration state of roll vibration by referring to a map stored in the storage unit 165 as the data 165a, and controls the driving unit 41 (see FIG. 2) of the vibration isolating support unit M based on the estimated result. For the above purpose, as shown in FIG. 18, the electric control unit UB includes a vibrational state estimating unit 623B, an actuator driving controlling unit 625, an engine starting determining unit 622B, and a phase detector 624.

The engine starting determining unit 622B determines a starting of the engine E (see FIG. 1B) by an initial explosion based on the crank pulse as described above. Then, the engine starting determining unit 622B informs the determination of detection of the initial explosion to the vibrational state estimating unit 623B. As described above, the engine starting determining unit 622B corresponds to an "initial explosion determining unit". In addition, since the engine starting determining unit 622B calculates an average value of the crank pulse per one cycle to detect a revolution change, the engine starting determining unit 622B corresponds to a "change detecting unit".

If the vibrational state estimating unit 623B is informed a determination of detection of an initial explosion from the engine starting determining unit 622B, the vibrational state estimating unit 623B calculates an increase rate NEr of the engine revolution speed just after the initial explosion as described above. Then, the vibrational state estimating unit 623B estimates a vibration state of roll vibration of the engine E (see FIG. 1B) corresponding to the calculated increase rate NEr by referring to a map stored in the storage unit 165 as the data 165a. Then, the vibrational state estimating unit 623B informs the estimated vibration state of roll vibration to the actuator driving controlling unit 625.

When the engine E is under an idling state, or all-cylinder operation, or selective-cylinder operation, the phase detector 624 compares a peak timing of revolution change of the crankshaft with a TDC timing to calculate a phase to output to the actuator driving controlling unit 625, based on a P-P value of revolution change of the crankshaft transmitted from the vibrational state estimating unit 623B, the peak timing of the revolution change, a crank pulse signal detected by the crank pulse sensor Sa, and a TDC pulse signal of each cylinder detected by a sensor, which is not shown.

The actuator driving controlling unit 625 combines an ensemble of duty signals in a driving cycle so that each of the front vibration isolating support unit Ma and the rear vibration isolating support unit Mb performs a mounting operation which can compensate an engine vibration waveform for each vibration cycle, based on the vibration state of roll vibration of the engine E informed by the vibrational state estimating unit 623B and the phase calculated by the phase detector 624, and controls outputs by a phase calculated from a standard pulse for each TDC.

With respect to the control performed by using an ensemble of duty signals in the driving cycle by the actuator driving controlling unit 625, please refer to paragraphs [0030], [0031], FIG. 5, and FIG. 6 in JP 2002-139095 A.

Next, functions of the phase detector 624 and actuator driving controlling unit 625 will be explained when the engine starting determining unit 622B determines that a revolution mode is in an engine starting state (period from engine starting to idling state).

In the state described above, based on a vibration cycle of a given natural vibration frequency (roll eigenvalue) transmitted from the vibrational state estimating unit 623B, a crank pulse detected by the crank pulse sensor Sa, and a TDC pulse signal of each cylinder detected by a sensor not shown, the phase detector 624 outputs information to the actuator driving controlling unit 625 so that a determination timing of starting of the engine E (see FIG. 1B) is output to, for example, the rear vibration isolating support unit Mb by delaying a phase by a predetermined time from the determination timing, and to the front vibration isolating support unit Ma by delaying half cycle from the phase of the rear vibration isolating support unit Mb.

In response to the above, the actuator driving controlling unit 625 combines the ensemble of duty signals in the driving cycle so that each of the front vibration isolating support unit Ma and the rear vibration isolating support unit Mb performs the mounting operation which can compensate the engine vibration waveform for each vibration cycle, and hereafter controls outputs with a fixed cycle.

It is noted that the vibrational state estimating unit 623B, the actuator driving controlling unit 625, the engine starting determining unit 622B, and the phase detector 624, which are included in the electronic control unit UB, may be configured with, for example, logic software installed in a program for driving the electronic control unit UB. However, the method is not limited to this, but may be configured with hardware logics.

Figure 19:
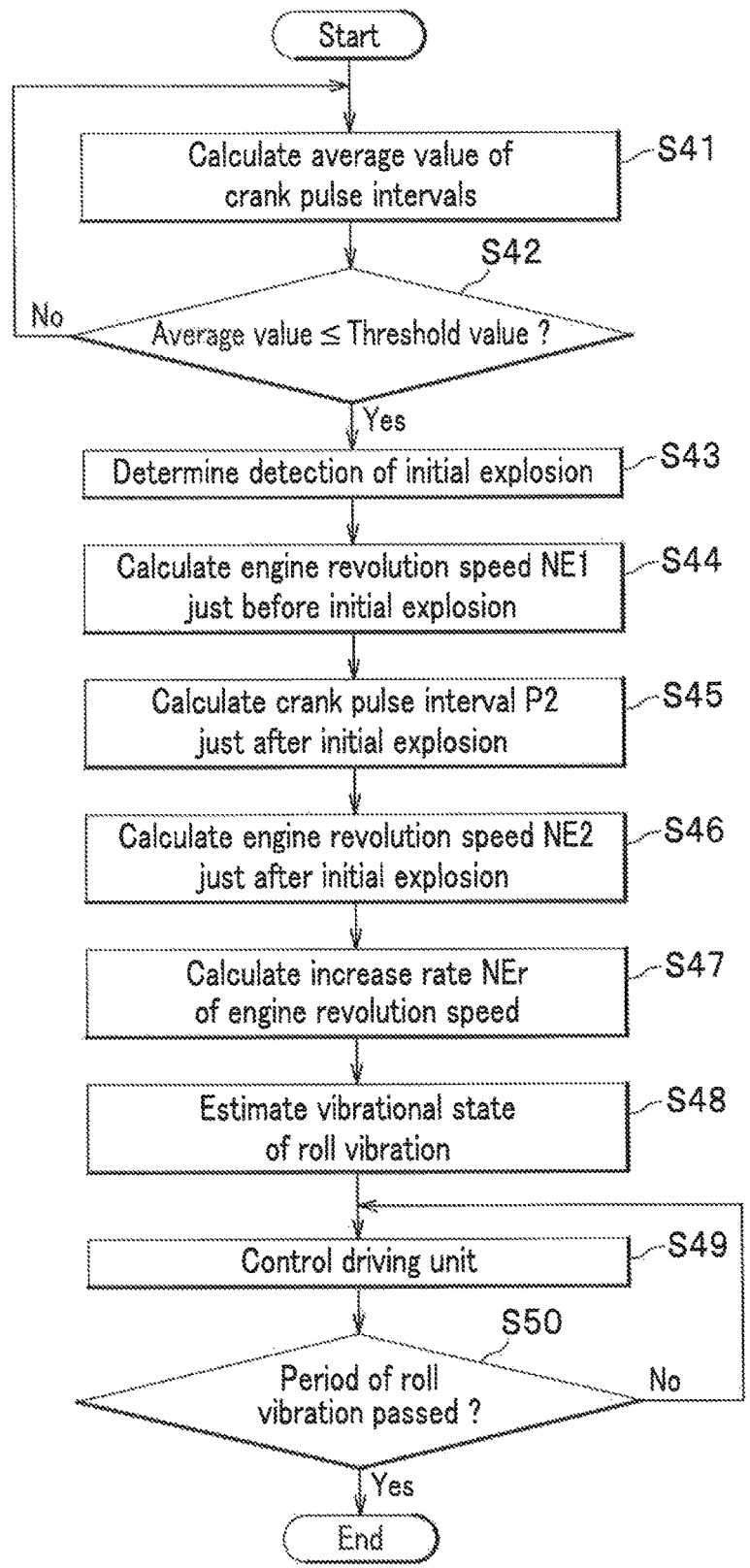
FIG. 19 is a flowchart showing a processing flow of estimating a vibration state of roll vibration.

FIG. 19 is a flowchart showing a control flow for estimating a vibration state of roll vibration. Hereinafter, a control for estimating a vibration state of roll vibration by the electronic control unit UB will be explained by referring to FIG. 19 (see FIG. 1 to FIG. 4 and FIG. 16 to FIG. 18 as appropriate).

As shown in FIG. 19, the engine starting determining unit 622B of the electronic control unit UB calculates an average value of interval of eight crank pulses by inputting therein the crank pulse Cp to be detected by the crank pulse sensor Sa (Step S41).

In step S42, if the calculated average value is larger (S42: No) than a threshold value, the step return to step S41. If a moving average value is smaller (S42: Yes) than the threshold value, the electronic control unit UB determines that the engine starting determining unit 622B detected an initial explosion (Step S43). Then, the engine starting determining unit 622B of the electronic control unit UB informs the determination of detection of the initial explosion to the vibrational state estimating unit 623B. Next, the vibrational state estimating unit 623B, which is informed the determination of detection of the initial explosion, calculates the engine revolution speed NE1 just before the initial explosion (Step S44).

It is noted that when the engine starting determining unit 622B continuously calculates an average value of the crank pulse interval, the engine starting determining unit 622B calculates the average value of eight continuous crank pulse intervals by shifting one pulse, that is, the engine starting determining unit 622B calculates the moving average value.

Next, the vibrational state estimating unit 623B of the electronic control unit UB measures the interval P2 of eight crank pulses just after the initial explosion (Step S45). Specifically, the interval P2 of eight crank pulses to be generated after A point shown in FIG. 17 is measured. Then, the vibrational state estimating unit 623B of the electronic control unit UB calculates the engine revolution speed NE2 just after the initial explosion by the formula (2)(Step S46). Further, the vibrational state estimating unit 623B calculates the increase rate NEr of the engine revolution speed just after the initial explosion by the formula (3) (Step S47).

The vibrational state estimating unit 623B of the electronic control unit UB estimates a vibration state of roll vibration corresponding to the increase rate NEr of the calculated engine revolution speed, by referring to a map, which is stored in the storage unit 165 as the data 165a, showing a relationship between the increase rate NEr of the engine revolution speed and the vibration state of roll vibration to be generated (Step S48). Further, the vibrational state estimating unit 623B informs the estimated vibration state of roll vibration to the actuator driving controlling unit 625.

The actuator driving controlling unit 625 of the electronic control unit UB controls a current flowing in the coil 46 to control the driving unit 41 of the vibration isolating support unit M based on the informed vibration state of roll vibration and a phase calculated by the phase detector 624 (Step S49), thereby resulting in reduction of the roll vibration at a starting of the engine E.

In step 50, the actuator driving controlling unit 625 checks whether or not a period of roll vibration of the estimated roll vibration has passed. If the period of roll vibration has not passed (S50: No), the step returns to step S49 to control the driving unit 41 of the vibration isolating support unit M. If the period of roll vibration of the estimated roll vibration has passed (S50: Yes), the electronic control unit UB ends the control.

As described above, an active vibration isolating support apparatus according to the present embodiment calculates an increase rate of engine revolution speed based on eight crank pulses just after initial explosion, and estimates a vibration state of roll vibration by referring to data corresponding to the calculated increase rate.

Since the engine revolution speed just after the initial explosion is about 400 rpm, if the engine is a V engine with six-cylinders, a time interval of eight crank pulses just after the initial explosion is about 0.05 seconds. In other words, in the active vibration isolating support apparatus 1 and the control method thereof according to the present embodiment, the vibration state of roll vibration to be generated at a starting of the engine can be estimated within 0.05 seconds from the initial explosion for starting a control of the active vibration isolating support apparatus 1.

Accordingly, the active vibration isolating support apparatus and the control method thereof according to the present embodiment can solve the conventional problem that the conventional active vibration isolating support apparatus can not follow the transient vibration at the starting of the engine, and has the excellent advantage to effectively reduce the transient vibration at the starting of the engine.

What is claimed is:

1. An active vibration isolating support apparatus for reducing vibration transmitted from an engine provided with a crank pulse sensor, wherein the engine in which a reciprocating motion of a piston is converted to a rotary motion of a crankshaft is supported via vibration isolating support units in a vehicle body each of which comprises an actuator, the active vibration isolating support apparatus comprising:
a control unit connected to the actuator and configured to drive the actuator to extend and contract periodically depending on a vibrational state of the engine, thereby reducing transmission of vibration of the engine to the vehicle body,
wherein the vibration isolating support units are disposed on opposite sides of the crankshaft, and
and wherein the control unit:
receives a TDC pulse signal to exhibit timing of a top dead center for each cylinder, and a crank pulse signal;
determines a detection of a starting of the engine;
sets a phase delay which delays a phase by a predetermined time difference from a timing at which it is determined that an initial explosion occurs to start the engine based on the TDC pulse signal and the crank pulse signal;
determines a first selected unit from one vibration isolating support unit and the other vibration isolating support unit, to drive the actuator thereof to extend and contract;
starts control of the one selected vibration isolating support unit with the set phase delay while maintaining the other vibration isolating support unit in an inactive state; and
drives the actuator of one of the vibration isolating support units to contract, the one of the vibration isolating support units being positioned on a side where the one is to be compressed by roll vibration associated with an initial explosion, so as to reduce transmission of roll vibration of the engine in a direction which is reverse to the rotation direction of the crankshaft of the engine when the initial explosion is determined to be detected by the control unit using crank pulse intervals output from the crank pulse sensor after a time when the engine starts at a time of starting of the engine.

2. The active vibration isolating support apparatus according to claim 1, wherein the initial explosion is determined to be detected if an increasing rate in an angular velocity of the crankshaft is greater than or equal to a predetermined value.

3. The active vibration isolating support apparatus according to claim 1, wherein the initial explosion is determined to be detected based on a signal from a crank pulse sensor.

4. The active vibration isolating support apparatus according to claim 1, wherein the actuator is controlled based on signals from the crank pulse sensor, a cam angle sensor, an engine revolution speed sensor, and an engine ECU.

* * * * *